(12) United States Patent
Wang et al.

(10) Patent No.: US 12,141,095 B2
(45) Date of Patent: Nov. 12, 2024

(54) SYSTOLIC ARRAY, SYSTOLIC ARRAY SYSTEM, COMPUTATION METHOD, DEVICE, AND STORAGE MEDIUM

(71) Applicant: Nanjing SemiDrive Technology LTD., Nanjing (CN)

(72) Inventors: Yu Wang, Nanjing (CN); Junyuan Wu, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 12 days.

(21) Appl. No.: 18/158,711

(22) Filed: Jan. 24, 2023

(65) Prior Publication Data
US 2024/0126716 A1 Apr. 18, 2024

(30) Foreign Application Priority Data

Sep. 30, 2022 (CN) .......................... 202211216188.4
Sep. 30, 2022 (CN) .......................... 202211216249.7

(51) Int. Cl.
*G06F 15/80* (2006.01)
*G06F 7/544* (2006.01)
*G06F 9/30* (2018.01)
*G06N 3/063* (2023.01)

(52) U.S. Cl.
CPC ........ *G06F 15/8046* (2013.01); *G06F 7/5443* (2013.01); *G06F 9/30101* (2013.01); *G06N 3/063* (2013.01)

(58) Field of Classification Search
CPC .............. G06F 15/8046; G06F 7/5443; G06F 9/30101; G06N 3/063
See application file for complete search history.

(56) References Cited

U.S. PATENT DOCUMENTS

| | | | |
|---|---|---|---|
| 5,091,864 A | 2/1992 | Baji et al. | |
| 11,507,429 B2* | 11/2022 | Lyuh | G06N 3/048 |
| 11,520,731 B1* | 12/2022 | Diamant | G06N 3/063 |
| 11,599,601 B2* | 3/2023 | Phelps | G06F 15/8046 |
| 2010/0235674 A1* | 9/2010 | Song | G06F 7/32 |
| | | | 718/100 |
| 2022/0129410 A1* | 4/2022 | Jung | G06F 11/07 |
| 2022/0365700 A1* | 11/2022 | Redfern | G06F 3/0647 |

OTHER PUBLICATIONS

The European Patent Office (EPO) The Extended European Search Report for 23165020.1 Sep 12, 2023 13 pages.

* cited by examiner

*Primary Examiner* — Corey S Faherty
(74) *Attorney, Agent, or Firm* — ANOVA LAW GROUP, PLLC

(57) ABSTRACT

A systolic array includes a plurality of basic computation units arranged in a matrix. A basic computation includes a feature input register configured to store first feature data, a result buffer configured to store first temporary data, a comparator connected to the feature input register and the result buffer, and a control register connected to the feature input register, the result buffer, and the comparator. The comparator is configured to compare the first feature data input with the first temporary data successively. The control register is configured to control the first feature data of the feature input register and the first temporary data to be input to the comparator, output a comparison result to the result buffer and a feature input register of a next basic computation unit, and after sorting, output the first temporary data last stored in the result buffer as a first data result.

18 Claims, 9 Drawing Sheets

---

Determine the operation mode indicated by the operation instruction according to the received operation instruction. ~ 410

When the operation mode is the sorting mode, after different configuration values are assigned to the control registers of the first basic computation unit and the second basic computation unit the systolic array according to the sorting control signal sent by the array controller, input the feature data of the feature buffer and the tag data corresponding to the feature data successively to the systolic array to perform the synchronous sorting operation, output the sorting feature data and the synchronous tag data corresponding to the sorting feature data after the sorting is performed, and transmit the sorting feature data and the synchronous tag data back to the system bus ~ 420

SYSTOLIC ARRAY, SYSTOLIC ARRAY SYSTEM, COMPUTATION METHOD, DEVICE, AND STORAGE MEDIUM

CROSS-REFERENCE TO RELATED APPLICATION

The present disclosure claims priority to Chinese Patent Application No. 202211216249.7, filed on Sep. 30, 2022, and Chinese Patent Application No. 202211216188.4, filed on Sep. 30, 2022, the entire contents of both of which are incorporated herein by reference.

TECHNICAL FIELD

The present disclosure generally relates to the intelligent artificial field and, more particularly, to a systolic array, a systolic array system, a systolic array computation method, a device, and a storage medium.

BACKGROUND

Artificial intelligence (AI) plays an important role in areas such as autonomous driving, face recognition, and medical services. Deep learning is one of AI algorithms that is widely discussed, researched, and applied in recent years.

In a deep learning structure, a convolutional neural network (CNN) is a neural network structure designed for processing image data. Since the convolution computation is mathematically translation invariant and local, the CNN can effectively extract an image feature. Thus, the CNN is broadly used in the computer vision field such as image classification and target detection. The high performance of CNN on image processing problems requires a large amount of computation. Generally, in CNN, convolution computation occupies a largest amount of computation, then followed by sorting computation.

In the existing technology, two solutions are included for a specific sorting operator. First, a sorting operator is efficiently processed by adding an additional heap sort hardware unit. Second, the sorting operator is supported through an internal vector operator. The unnecessary area is increased by adding the additional hardware unit. The data that needs to be sorted is usually generated by an internal systolic array in the accelerator. To use the additional hardware or vector unit, the data needs to be transferred from the systolic array to outside for processing. The problem of wasting the bandwidth due to the data transfer cannot be solved. A tracking function of the sorted data cannot be directly realized through the existing systolic array. Thus, the utilization rate of the existing systolic array is poor.

SUMMARY

Embodiments of the present disclosure provide a systolic array, including a plurality of basic computation units. The plurality of basic computation units are arranged and connected in a matrix. A basic computation unit of the plurality of basic computation units includes a feature input register configured to store first feature data, a result buffer configured to temporarily store first temporary data, a comparator connected to the feature input register and the result buffer, and a control register connected to the feature input register, the result buffer, and the comparator. The comparator is configured to compare the first feature data input by the feature input register with the first temporary data temporarily stored in the result buffer successively. The control register is configured to control the first feature data of the feature input register and the first temporary data temporarily stored in the result buffer to be input to the comparator, output a comparison result to the result buffer and a feature input register of a next basic computation unit, and after sorting is performed, output the first temporary data last stored in the result buffer as a first data result.

Embodiments of the present disclosure include a systolic array system, including a systolic array, a feature buffer, an output buffer, an array controller, and a system bus. The systolic array includes a plurality of basic computation units. The plurality of basic computation units are arranged and connected in a matrix. A basic computation unit of the plurality of basic computation units includes a feature input register configured to store first feature data, a result buffer configured to temporarily store first temporary data, a comparator connected to the feature input register and the result buffer, and a control register connected to the feature input register, the result buffer, and the comparator. The comparator is configured to compare the first feature data input by the feature input register with the first temporary data temporarily stored in the result buffer successively. The control register is configured to control the first feature data of the feature input register and the first temporary data temporarily stored in the result buffer to be input to the comparator, output a comparison result to the result buffer and a feature input register of a next basic computation unit, and after sorting is performed, output the first temporary data last stored in the result buffer as a first data result. The array controller is connected to the feature buffer, the systolic array, and the output buffer and configured to control the first feature data to be input to the feature buffer after a first control signal is sent according to a first control instruction, input the first feature data of the feature buffer to the systolic array one by one to perform sorting operation after first configuration values are assigned to control registers of the basic computation units of the systolic array, and transmit the first data result to the output buffer after the sorting is performed. The system bus is connected to the array controller, the feature buffer, and the output buffer and configured to send the first control instruction to the array controller, and receive the first data result uploaded by the output buffer after the sorting is performed.

Embodiments of the present disclosure provide a systolic array system computation method. The method includes determining an operation mode indicated by an operation instruction according to the received operation instruction, in response to the operation mode being a sorting mode, after assigning a first configuration value to control registers of basic computation units in a systolic array according to a first control signal sent by an array controller, inputting first feature data of a feature buffer to the systolic array one by one to perform a sorting operation, outputting a first data result output by an output buffer, and transmitting the first data result back to a system bus. A basic computation unit of the systolic array includes a comparator. The first feature data of the feature buffer includes a plurality of candidate detection frame values generated by a neural network model.

The present disclosure provides the systolic array, the systolic array system, the computation method, the device, and the storage medium. The operation mode indicated by the operation instruction can be determined according to the received operation instruction. When the operation mode is the sorting mode, after the first configuration values are assigned to the control registers of the basic computation units of the systolic array according to the first control signal sent by the array controller, the first feature data of the feature buffer can be input to the systolic array one by one to perform the sorting operation. The first data result can be output through the output buffer and can be transmitted back to the system bus. The basic computation unit of the systolic array can include the comparator. The convolution computation of the neural network can be accelerated. Meanwhile, the sorting function can be realized. The operation of transferring the data to another apparatus to perform the sorting operation can be avoided to save computation time and bandwidth. The utilization rate of the systolic array can be improved in the computation.

In addition, when the operation mode is the sorting mode, after different configuration values are assigned to the control registers of the first basic computation unit and the second basic computation unit of the systolic array according to the sorting control signal sent by the array controller, input the feature data of the feature buffer and the tag data corresponding to the feature data to the systolic array successively in groups to perform the synchronous sorting operation. After the sorting is performed, the sorting feature data and the synchronous tag data corresponding to the sorting feature data can be output through the output buffer and transmitted back to the system bus. Thus, the direct computation and following function of the complex operator can be realized in the systolic array. The utilization rate of the systolic array can be improved. The transmission bandwidth waste problem due to the data transfer can be avoided.

Other features and advantages of the present disclosure are described in the description below. Some of the features and advantages become apparent in the description or may be learned by implementing the disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE EMBODIMENTS

To make the purposes, features, and advantages of the present disclosure clearer, the technical solutions of embodiments of the present disclosure are described in detail in connection with the accompanying drawings of embodiments of the present disclosure. Obviously, the described embodiments are only some embodiments of the present disclosure, but not all embodiments. Based on embodiments in the present disclosure, all other embodiments obtained by those skilled in the art without creative efforts belong to the scope of the present disclosure.

In CNN, in addition to the convolution computation, the sorting computation also occupies a large amount of computation resource. The sorting computation is usually used in a target detection algorithm. As the algorithm continues to be developed, in many scenarios, a position of each piece of sorted data in the original data is required. For example, when same data is included, the data needs to be distinguished according to the positions of the data in the original data. For another example, in a Non-Max suppression (NMS) in the target detection algorithm, the data needs to be sorted according to a specific item. Information on other items is reserved the information for subsequent computations.

Although the systolic array has high parallel processing capability and has a good acceleration effect on the convolution computation, the systolic array does not have a sorting computation function. However, the sorting computation is essential in a target detection network. When the sorting computation is involved, because the existing systolic array cannot process the sorting computation, data can only be transferred to another apparatus to perform the sorting computation individually. A data transfer process occupies a transmission bandwidth. Because the sorting computation generally occurs at a last step of the target detection network, when the data is processed at the another apparatus, the systolic array of the current apparatus is in idle state. Thus, the utilization rate is low.

Figure 1A:
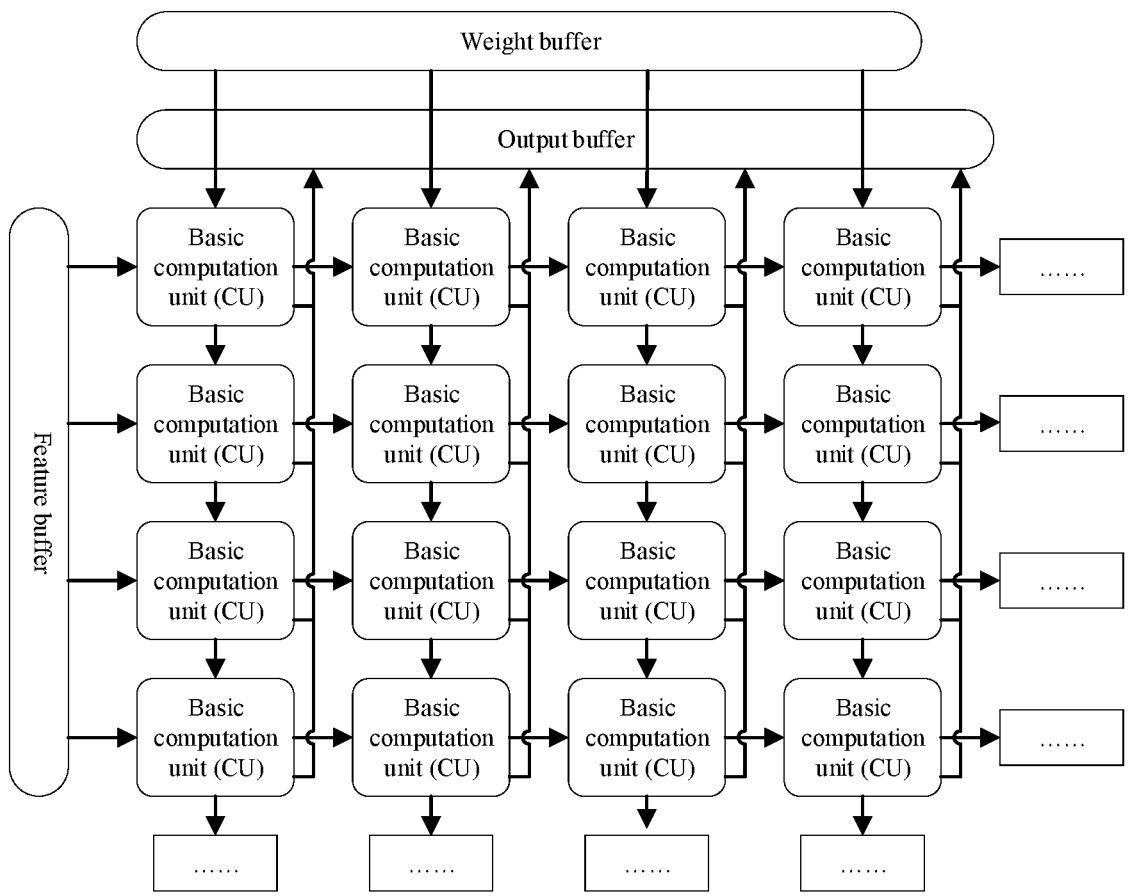
FIG. 1A illustrates a schematic structural diagram of a systolic array according to some embodiments of the present disclosure.

FIG. 1A illustrates a schematic structural diagram of a systolic array according to some embodiments of the present disclosure. The systolic array includes a plurality of basic computation units arranged and connected in a matrix. Each basic computation unit includes a feature input register, a comparator, a result buffer, and a control register, which are configured to perform sorting in a sorting mode. As shown in FIG. 1A, the systolic array of embodiments of the present disclosure includes M×N configurable basic computation units.

Figure 1B:
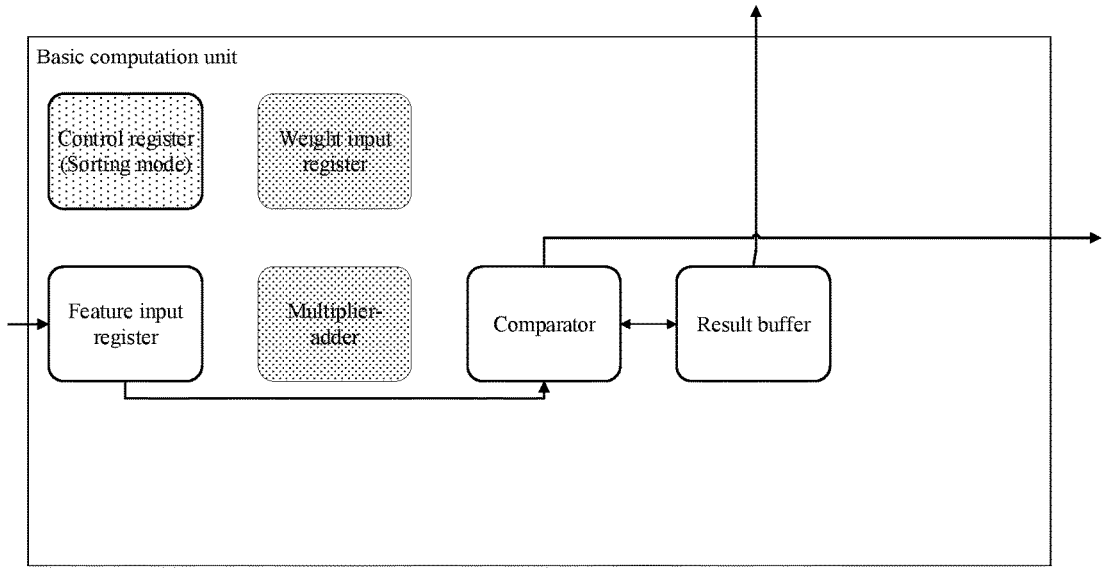
FIG. 1B illustrates a schematic structural diagram showing a basic computation unit of a systolic array in a sorting mode according to some embodiments of the present disclosure.

FIG. 1B illustrates a schematic structural diagram showing a basic computation unit of a systolic array in the sorting mode according to some embodiments of the present disclosure. As shown in FIG. 1B, in the sorting mode, a weight input register and a multiplier-adder do not participate in computation. The control register can be connected to the feature input register, the result buffer, and the comparator. The connection between the control register and the feature input register, the result buffer, and the comparator is not shown in the drawing.

The feature input register can be used to store first feature data. The result buffer can be used to temporarily store first temporary data.

The comparator is connected to the feature input register and the result buffer and can be used to successively compare the first feature data input by the feature input register with the first temporary data temporarily stored in the result buffer.

The control register can be connected to the feature input register, the result buffer, and the comparator and can be used to control the first feature data of the feature input register and the first temporary data temporarily stored in the result buffer to be input to the comparator. The control register can be further used to control the comparator to output a comparison result to the result buffer and a feature input register of a next basic computation unit and output the first temporary data finally stored in the result buffer as a first data result after the sorting is completed.

The basic computation unit can refer to a smallest component unit in the systolic array. Each basic computation unit can independently perform basic convolution computation and sorting computation. The feature input register can refer to a register used to store feature data. The comparator can refer to an electronic element that outputs the comparison result at an output end by comparing values of two feature at an input end. The result buffer can refer to a memory used to temporary store a feature meeting a comparison result condition. The control register can refer to a memory storing execution commands of different operation modes. The register can refer to a high-speed storage member with limited storage capacity, which can be used to temporarily store instructions, data, and addresses. The buffer can refer to a memory that can perform high-speed data exchange.

The first feature data can be at least one piece of data stored in the feature input register in the sorting mode. The first temporary data can be a piece of data temporarily stored in the result buffer meeting the comparison result condition. The first data result can be data composed of first temporary data of result buffers of a plurality of basic computation units having a certain sorting feature.

In embodiments of the present disclosure, the comparator can be configured to compare the values of the first feature data input by the feature input register and the first temporary data temporarily stored in the result buffer in sequence, and according to a predetermined sorting rule, using feature data meeting a first sorting condition as new first temporary data of a corresponding result buffer and using feature data meeting a second sorting condition as the first feature data of the feature input register of the next basic computation unit.

In some embodiments, the control register can be configured to control the new first temporary data to be output to the result buffer and output the feature data meeting the second sorting condition to the feature input register of the next basic computation unit.

The first sorting condition, the second sorting condition, and the predetermined sorting rule can be conditions set according to actual needs. For example, the first sorting condition can be data with a larger sorting result, and the second sorting condition can be data with a smaller sorting result.

In some embodiments, the feature input register of embodiments of the present disclosure can only store one piece of first feature data at a time. All the first feature data with the sorting requirement can be stored in a feature buffer in a systolic array system including the systolic array. When the first feature data that is to be sorted is input into the basic computation unit, one piece of the first feature data can be input each time from the feature buffer or a last basic computation unit in sequence. The first feature data can be input into the basic computation units of the systolic array according to a sequence meeting the sorting requirement. For example, in embodiments of the present disclosure, the first sorting condition may be the data with the larger sorting result, and the second sorting condition may be the data with the smaller sorting result.

In some embodiments, in default, the first feature data that is the first being input into the result buffer of the basic computation unit cannot trigger the computation and directly enter the result buffer. Taking the current basic computation unit as an example for illustration, in embodiments of the present disclosure, the first first feature data a can be directly and temporarily stored in the result buffer. Then, in embodiments of the present disclosure, the second first feature data b and the first first feature data a temporarily stored in the result buffer can be input into the comparator for comparison. If b is greater than a, the first feature data b can be used as the new first temporary data to be input into the result buffer, and the first feature data a can be input into the next basic computation unit. In the next basic computation unit, values can be compared according to the above sorting rule. Then, the data meeting the first sorting condition can be input into the result buffer, and the data meeting the second sorting condition can be input into a next basic computation unit. That is, in embodiments of the present disclosure, the data with the larger comparison result can be stored in the result buffer, and the data with the smaller comparison result can be sorted in the next basic computation unit. Since the first feature data enters the basic computation units in sequence according to the sorting requirement, the data output by the basic computation units can be a series of first feature data with a sorting feature of from large to small.

In some embodiments, the control register can send a control signal corresponding to the sorting mode to control the first feature data of the feature input register and the first temporary data temporarily stored in the result buffer to be input into the comparator for comparison and input the comparison result into the result buffer and the next basic computation unit. Since the first feature data of the feature input register enters the comparator one by one, after the sorting computation of a current comparison cycle is performed, the comparator then can perform a comparison on the newly input first feature data and the first temporary data temporarily stored in the current result buffer, and so on. By continuously inputting the first feature data into the comparator one by one and performing a plurality of comparison cycles on the data successively, the first feature data meeting the second sorting condition can be continuously input into the next basic computation unit. By analogy, the next basic computation unit can be configured to perform a same type of sorting computation. Thus, a plurality of pieces of first feature data can be sorted. Meanwhile, the current basic computation unit can obtain maximum or a minimum feature data.

Figure 1C:
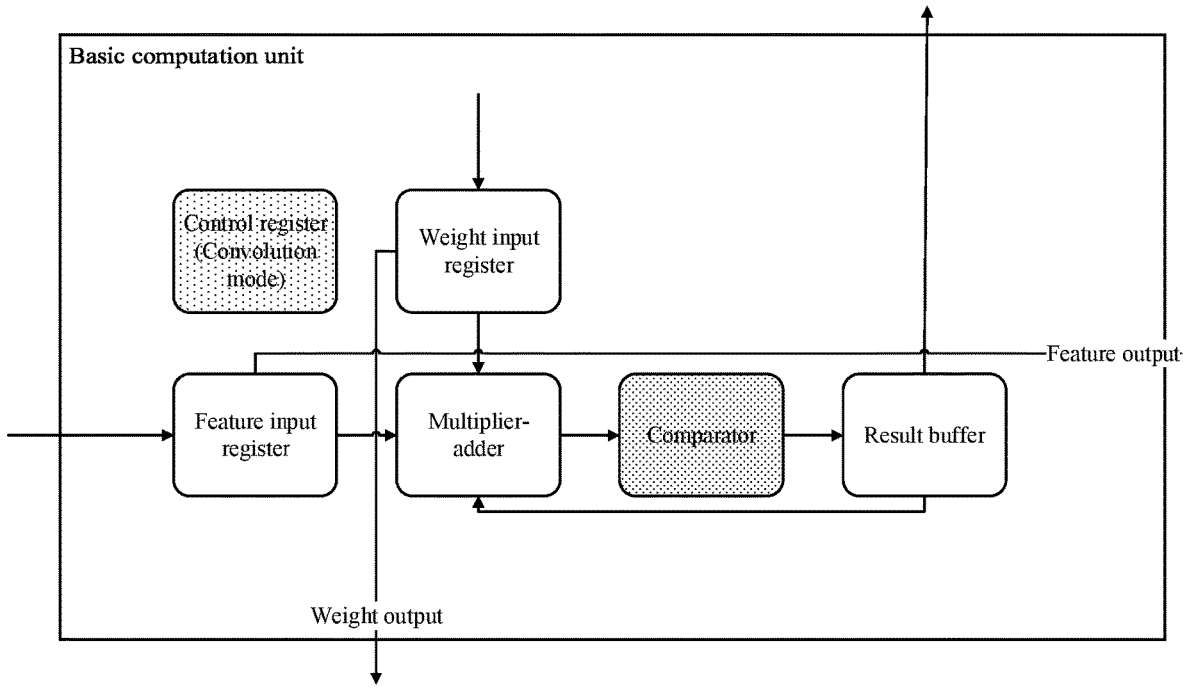
FIG. 1C illustrates a schematic structural diagram showing a basic computation unit of a systolic array in a convolution mode according to some embodiments of the present disclosure.

FIG. 1C illustrates a schematic structural diagram showing a basic computation unit of a systolic array in a convolution mode according to some embodiments of the present disclosure. As shown in FIG. 1C, each basic computation unit further includes a weight input register and a multiplier-adder. In the convolution mode, the comparator cannot participate in the operation. The control register can be connected to the feature input register, the weight input register, the result buffer, and the multiplier-adder. The connection between the control register and the feature input register, the weight input register, the result buffer, and the multiplier-adder is not shown in the drawing. The basic computation unit of embodiments of the present disclosure can be configured to perform the convolution computation in the convolution mode.

The weight input register can be configured to store weight data.

The multiplier-adder can be connected to the feature input register, the weight input register, and the result buffer and can be configured to use second temporary data temporarily stored in the result buffer as a cumulative addend, successively perform multiplication computation on second feature data input by the feature input register and the weight data input by the weight input register, and store a computation result as new second temporary data.

Correspondingly, the feature input register can be configured to store the second feature data.

The control register can be connected to the weight input register and the multiplier-adder and can be configured to control the weight data of the weight input register, the second feature data of the feature input register, and the second temporary data temporarily stored in the result buffer to input into the multiplier-adder. After the current computation cycle, the control register can be configured to transfer the second feature data to a feature input register of a first neighboring basic computation unit and the weight data to a weight input register of a second neighboring basic computation unit, and after the convolution computation, output the second temporary data finally stored in the result buffer as a second data result.

The weight input register can refer to a register configured to store the weight data. In the image processing field, the weight data can be convolution window data. In other fields, the weight data can also be any data requiring convolution.

The second feature data can be at least one piece of data stored in the feature input register in the convolution mode. In the image processing field, the second feature data can be image data. In other fields, the second feature data can also be any data required the convolution. The second temporary data can be the cumulative addend required in the current computation cycle. The second data result may be data composed of second temporary data with a new feature of the result buffers of the plurality of basic computation units.

The weight data of the weight input register and the second feature data of the feature input register can be input from two different directions into the basic computation unit that currently needs to be computed. Thus, the first neighboring basic computation unit and the second neighboring basic computation unit can be basic computation units of different directions neighboring to the basic computation unit that currently needs to be computed. For example, the first neighboring basic computation unit can be a basic computation unit that is neighboring to the basic computation unit that currently needs to be computed in a horizontal direction. The second neighboring basic computation unit can be a basic computation unit neighboring to the basic computation unit that currently needs to be computed in a vertical direction.

In some embodiments, the basic computation unit can also be configured to realize a basic function of the convolution computation. Two series of feature data requiring convolution ca be stored in the weight input register and feature input register and can be input into the multiplier-adder for the convolution computation to obtain the data with the new feature.

In some embodiments, the convolution computation of the current basic computation unit is taken as an example for illustration. The control register can send a control signal corresponding to the convolution mode to control the weight data of the weight input register, the second feature data of the feature input register, and the second temporary data temporarily stored in the result buffer to be input into the multiplier-adder. In each computation cycle, the second temporary data temporarily stored in the result buffer can be used as a cumulative addend. The multiplication computation of the second feature data and the weight data can be performed successively. The computation result can be stored in the result buffer as new second temporary data. That is, each time after the multiplication computation of the second feature data and the weight data is completed, the second temporary data temporarily stored in the result buffer can be accumulated. The accumulated computation result can be used as the new second temporary data. Moreover, in embodiments of the present disclosure, after the current computation cycle is completed, the second feature data and the weight data can be transmitted to the feature input register and weight input register of the next basic computation unit, respectively. The same convolution computation can be performed on the newly input second feature data and weight data. Similarly, for the convolution computation of the next basic computation unit, reference can be made to the above description.

In some embodiments, a convolution computation in a convolutional neural network (CNN) can be taken as an example for illustration. The convolution computation can be a weighted moving average computation, including two input tensors. In the image processing field, a convolution computation that computes a plurality of sliding windows simultaneously in the systolic array can be realized. The two input tensors can include a sliding window weight (weight) and a feature map, which are used to output a new feature map. In a common image processing network, the input weight and the feature map can be both four-dimensional tensors, which can be represented as $F_{in}[B, C_{in}, X_{in}, Y_{in}]$ and $W[C_{out}, C_{in}, K_X, K_Y]$, respectively. The output weight map can be represented as $F_{out}[B, C_{out}, X_{out}, Y_{out}]$. B denotes batch, $C_{in}$ and $C_{out}$ denote numbers of input and output channels, $X_{in}$, $Y_{in}$, $X_{out}$, and $Y_{out}$ denote widths and heights of input and output images, respectively. $K_X$ and $K_Y$ denote the width and height of the weight. Thus, a two-dimensional convolution computation can be represented as:

$$F_{out}[b, c_{out}, x_{out}, y_{out}] = \sum_{\Delta x, \Delta y, C_{in}} W[c_{out}, c_{in}, \Delta x, \Delta y] \times F_{in}[b, c_{in}, x_{in}, y_{in} + \Delta x, y_{in} + \Delta y]$$

where, $\Delta x$ and $\Delta y$ denote a two-dimensional coordinate deviation of the image. Corresponding to the weight two-dimensional coordinate, the weight value involved in the computation is specified. $x_{in}$, $y_{in}$, $x_{out}$, and $Y_{out}$ represent the two-dimensional coordinates, $x_{in} \leq X_{in}, y_{in} \leq Y_{in}, x_{out} \leq X_{out}, y_{out} \leq Y_{out}$. Each output coordinate $(x_{out}, y_{out})$ corresponds to an unique input coordinate $(x_{in}, y_{in})$, and the convolution computation takes $(x_{in}, y_{in})$ as the origin and computes within a deviation range of $\Delta x$ and $\Delta y$.

In some embodiments, on a single channel, the convolution computation can be performed in a form of a two-dimensional sliding window. However, in the actual computation, the two-dimensional sliding window can be difficult to be directly implemented on the hardware platform. Thus, the data within the range of the sliding window may need to be re-sorted and converted into a vector inner product. Therefore, by combining computations of different channels, the convolution computation can be equivalently converted into a matrix multiplication computation. In the convolution/matrix mode, the comparator of the basic computation unit can be bypassed. An input feature value of a single basic computation unit can be multiplied by a weight value and then added to an intermediate result in the result buffer. If the result buffer is empty, the addition can be skipped. The result of the multiplication and addition can be directly and temporarily stored in the result buffer. Meanwhile, the weight value and the feature value can be output to the next basic computation unit along the original direction. Each basic computation unit can repeat the same type of multiplication and addition computation. After the current round of computation is performed, final result data can be output.

In some embodiments, by setting the comparator in the conventional systolic array and setting the corresponding commands that need to be executed by the control register in the sorting computation, the sorting function can be realized. Thus, an operation of transferring the data to another apparatus for performing the sorting computation can be avoided, which saves the computation time and bandwidth and improves the utilization rate of the systolic array in the computation.

In some embodiments, the basic computation unit can refer to a smallest unit forming the systolic array. A first basic computation unit can be a computation unit configured to perform sorting on input feature data. A second basic computation unit can be an computation unit configured to perform following and sorting on a tag corresponding to the input feature data.

In some embodiments, the systolic array of embodiments of the present disclosure can include two types of basic computation units, including the first basic computation unit and the second basic computation unit. The first basic computation unit and the second basic computation unit can be connected in a matrix arrangement corresponding to rows. As shown in FIG. 1A, for example, a first row can include first basic computation units, and a second row can include second basic computation units.

Figure 1D:
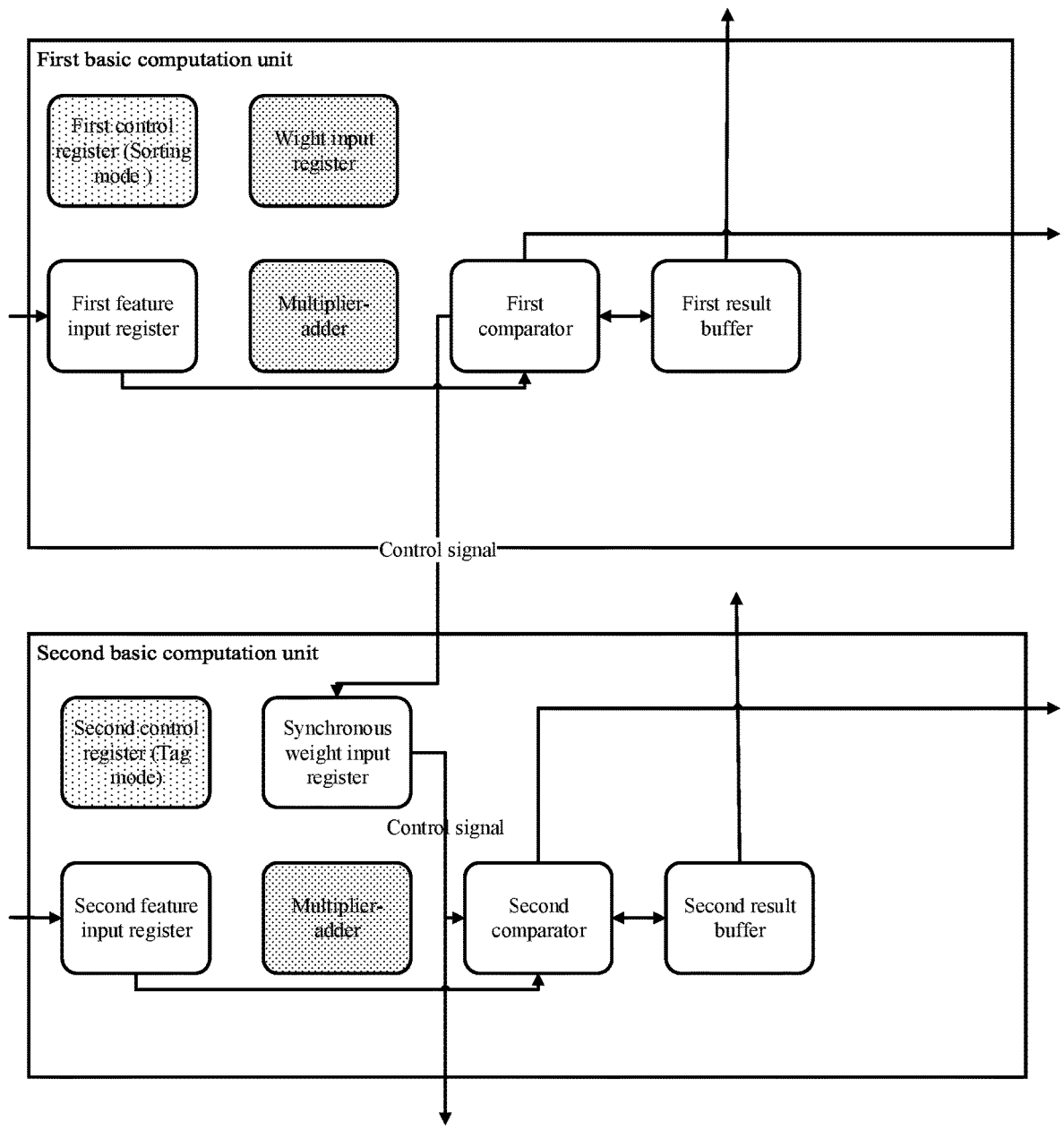
FIG. 1D illustrates a schematic structural diagram showing a basic computation unit of a systolic array in a sorting mode according to some embodiments of the present disclosure.

FIG. 1D illustrates a schematic structural diagram showing a basic computation unit of a systolic array in a sorting mode according to some embodiments of the present disclosure. As shown in FIG. 1D, in the sorting mode, the weight input register and the multiplier-adder do not participate in the computation. A first control register can be connected to a first feature input register, a first result buffer, and a first comparator. The connection relationship between the first control register and the first feature input register, the first result buffer, and the first comparator is not shown in the drawing. A second control register can be connected to a second feature input register, a synchronous weight input register, a second result buffer, and a second comparator. The connection relationship between the second control register and the second feature input register, the synchronization weight input register, the second result buffer, and the second comparator are not shown in the drawing.

Each first basic computation unit includes the first comparator, the first control register, and the first result buffer. The first comparator can be configured to compare the input feature data. The first control register can be configured to control a symbol comparison result to be output to the second basic computation unit corresponding to the current first basic computation unit as a synchronous control signal. Thus, a comparison data result can be output to the first result buffer and a first feature input register of a next first basic computation unit. After the sorting is performed, the first control register can be further configured to output temporary feature data eventually stored in the first result buffer as sorting feature data.

Each second basic computation unit includes the second comparator, the second control register, the second result buffer, and the synchronous weight input register. The second comparator can be configured to compare input tag data according to the synchronous control signal received by the synchronous weight input register. The second control register can be configured to control a tag comparison result to be output to the second result buffer and a second feature input register of a next second basic computation unit. After the sorting is performed, the second control register can be further configured to synchronically output the temporary tag data eventually stored in the second result buffer as the synchronous tag data of the sorting feature data.

In embodiments of the present disclosure, each first basic computation unit includes the first feature input register configured to store the feature data and the first result buffer configured to temporarily store the temporary feature data. Each second basic computation unit includes the second feature input register configured to store the tag data and the second result buffer configured to temporarily store the temporary tag data.

Correspondingly, the first control register can be further configured to successively input the feature data of the first feature input register and the temporary feature data of the first result buffer into the first comparator. The second control register can be further configured to successively input the tag data of the second feature input register and the temporary tag data of the second result buffer to the second comparator.

The first comparator can be an electronic element that outputs a comparison result at an output end by comparing values of two features of input ends. The control register can be a memory that stores execution commands in different operation modes, for example, a related instruction of performing the convolution computation in the convolution computation mode, and a related instruction of performing the sorting computation in the sorting mode. The first control register can be configured to execute an instruction related to the sorting computation in the sorting mode. The first result buffer can be configured to temporarily store feature data that meets a comparison result condition. The first feature input register can be a register configured to store the feature data. The sorting feature data can be the feature data with a certain sorting rule.

The second comparator can be an electronic element configured to directly determine a comparison relationship of two pieces of tag data of the input ends according to the synchronous control signal and output the comparison result at the output end. That is, the second comparator does not need to perform an actual comparison operation and can directly use a comparison symbol carried by the synchronous control signal as the comparison result by using a comparison function of the comparator. Thus, the two pieces of tag data corresponding to the comparison result can move following the feature data synchronously. The second control register can be configured to execute an instruction related to label sorting computation in a label mode. The second result buffer can be a memory configured to temporarily store tag data meeting the comparison result condition. The second feature input register can be a register configured to store the label data. The synchronous weight input register can be used as a bridge between the first basic computation unit and the second basic computation unit and configured to store the comparison symbol of the first comparator of the first basic computation unit. The synchronous tag data of the sorting feature data can be the tag data corresponding to the sorting feature data in the first basic computation unit. In the image processing field, the feature data can be the plurality of candidate detection frame values generated by the neural network model. The tag data can be position index information corresponding to the plurality of candidate detection frame values.

In embodiments of the present disclosure, the first comparator can be configured to successively compare the values of the feature data input by the first feature input register and the temporary feature data input by the first result buffer, use the feature data meeting the first sorting condition as new temporary feature data according to a predetermined sorting rule, and use the feature data meeting the second sorting rule as the feature data of the first feature input register of the next first basic computation unit.

Correspondingly, the first control register can be further configured to control the new temporary feature data to be output to the first result buffer and output the feature data meeting the second sorting condition to the first feature input register of the next first basic computation unit.

In embodiments of the present disclosure, the second comparator can be configured to compare the tag data input by the second feature input register with the temporary tag data input by the second result buffer according to the synchronous control signal received by the synchronous weight input register, use the tag data meeting the first sorting condition as the new temporary tag data, and use the tag data meeting the second sorting condition as the tag data of the second feature input register of the next second basic computation unit.

Correspondingly, the second control register can be further configured to control the new temporary tag data to be synchronously output to the second result buffer and synchronously output the tag data meeting the second sorting condition to the second feature input register of the next second basic computation unit.

The first sorting condition, the second sorting condition, and the predetermined sorting rule can be conditions set according to actual needs. For example, the first sorting condition can be data with a larger sorting result, and the second sorting condition can be data with a smaller sorting result. The predetermined sorting rule can be sorting from large to small, or inputting the feature data with the larger sorting result into the first result buffer and inputting the tag data with the larger sorting result into the second result buffer.

In some embodiments, a sort operator having a tag, which can also be referred to as a shadow mode, can be supported. That is, the first basic computation unit can be configured to compare the value of the input feature data. The second basic computation unit does not actually compare the value of the tag data, but uses the comparison symbol of the second basic computation unit as a reference to move the tag data of the second basic computation unit following the feature data of the first basic computation unit. After the sorting is performed, the temporary feature data eventually stored in the first result buffer can be output as the sorting feature data.

The temporary tag data last eventually stored in the second result buffer can be output as the synchronous tag data of the sorting feature data.

In some embodiments, the current first basic computation unit and the second basic computation unit can be taken as an example for illustration. The first result buffer and the second result buffer can be configured to directly and temporarily store the first input data by default. The feature data that is input according to a sequence can include feature data A and tag data a corresponding to feature data A being used as the first data input to the systolic array, feature data B and tag data b, and feature data C and tag data c. The predetermined sorting rule can include inputting the feature data with the larger sorting result into the first result buffer and inputting the tag data with the larger sorting result into the second result buffer, and inputting the feature data with the smaller sorting result to the next computation unit and inputting the tag data with the smaller sorting result to the next basic computation unit. The first sorting condition can be the data with the larger comparison result. The second sorting condition can be the data with the smaller comparison result.

Exemplarily, in the first basic computation unit, the first control register can be configured to first temporarily store first feature data A of the first feature input register directly into the first result buffer by default. No synchronous control signal can be output. When second feature data B is input into the first comparator, feature data A of the first result buffer can be also input into the first comparator for comparison. The first comparator can first compare input feature data B with feature data A of the first result buffer. If the comparison data result is "A>B," and the comparison symbol is ">," feature data A meeting the first sorting condition can be used as the new temporary feature data. Feature data B meeting the second sorting condition can be used as the feature data in the first feature input register of the next basic computation unit. The first control register can output feature data A to the first result buffer, output feature data B to the first feature input register of the next basic computation unit, and output the comparison symbol ">" as the synchronous control signal to the second basic computation unit corresponding to the current first basic computation unit. Then, in embodiments of the present disclosure, third feature data C and the feature data A temporarily stored in the result buffer can be input into the first comparator for comparison. The comparison process can refer to the above process. In the next basic computation unit, the same type of value comparison can be performed according to the feature data that is successively input, which is not repeated here.

In some embodiments, in the second basic computation unit, the second control register can first temporarily store tag data a of the first second feature input register directly into the second result buffer by default. When second tag data b is input to the second comparator, second tag data b can be compared with tag data a of the second result buffer input to the second comparator. The second comparator can directly compare the input tag data according to the synchronous control signal ">" received by the synchronous weight input register. The tag comparison result can be "a>b." Tag data a meeting the first sorting condition can be used as the new temporary tag data. Tag data b meeting the second sorting condition can be used as the feature data of the second feature input register of the next basic computation unit. The second control register can control tag data a to be output to the second result buffer and control tag data b to be output to the second feature input register of the next basic computation unit. Thus, feature data A and tag data a, and feature data B and tag data b can be synchronously output. Then, in some embodiments, third tag data c and tag data a temporarily stored in the result buffer can be input into the second comparator for value comparison. For the comparison process, reference can be made above. The same type of comparison can be performed according to the input tag data in the next basic computation unit, which is not repeated here.

In embodiments of the present disclosure, by arranging the comparator in a conventional systolic array, the basic computation units in the systolic array can be classified. The first basic computation unit can be configured to perform sorting on the feature data. The second basic computation unit can be configured to perform sorting on the tag data corresponding to the feature data. The corresponding instructions that need to be executed by the first control register and the second control register can be set in the sorting computation. The shadow mode can be allowed. That is, the control signal can be transmitted through the weight input/output line of the systolic array. A direction in which data of the second basic computation unit flows can be controlled by a computation result of a neighboring unit, which can realize a complex synchronous sorting function of the data having the tag. The operation of transferring the data to another apparatus to perform sorting can be avoided, which saves computation time and bandwidth. The utilization rate of the systolic array can be improved in the computation under the situation of a plurality of layers of network computation and complex operators. Bandwidth demand of the external system bus and requirement of external additional computation power can be reduced.

In embodiments of the present disclosure, the systolic array can further include a plurality of first basic computation units and a plurality of second basic computation units, which are classified as a same convolution basic computation unit. The convolution basic computation unit can include a convolution weight input register, a convolution feature input register, a convolution result buffer, a convolution control register, and a multiplier-adder.

The convolution weight input register can be configured to store convolution weight data.

The convolution feature input register can be configured to store convolution feature data.

The convolution result buffer can be configured to temporarily store convolution temporary data.

The multiplier-adder can be configured to use the convolution temporary data temporarily stored in the convolution result buffer as a cumulative addend, successively perform multiplication computation on the convolution feature data input by the convolution feature input register and the convolution weight data input by the convolution weight input register, and use a computation result as new convolution temporary data.

The convolution control register can be configured to control the convolution weight data of the convolution weight input register, the convolution feature data of the convolution feature input register, and the convolution temporary data temporarily stored in the convolution result buffer to be input the multiplier-adder. After the current computation cycle is performed, the convolution feature data and convolution weight data can be transferred to the convolution feature input register and the convolution weight input register of the next convolution basic computation unit. After the convolution computation is performed, the convolution temporary data eventually stored in the convolution result buffer can be output as a convolution data result.

Figure 1E:
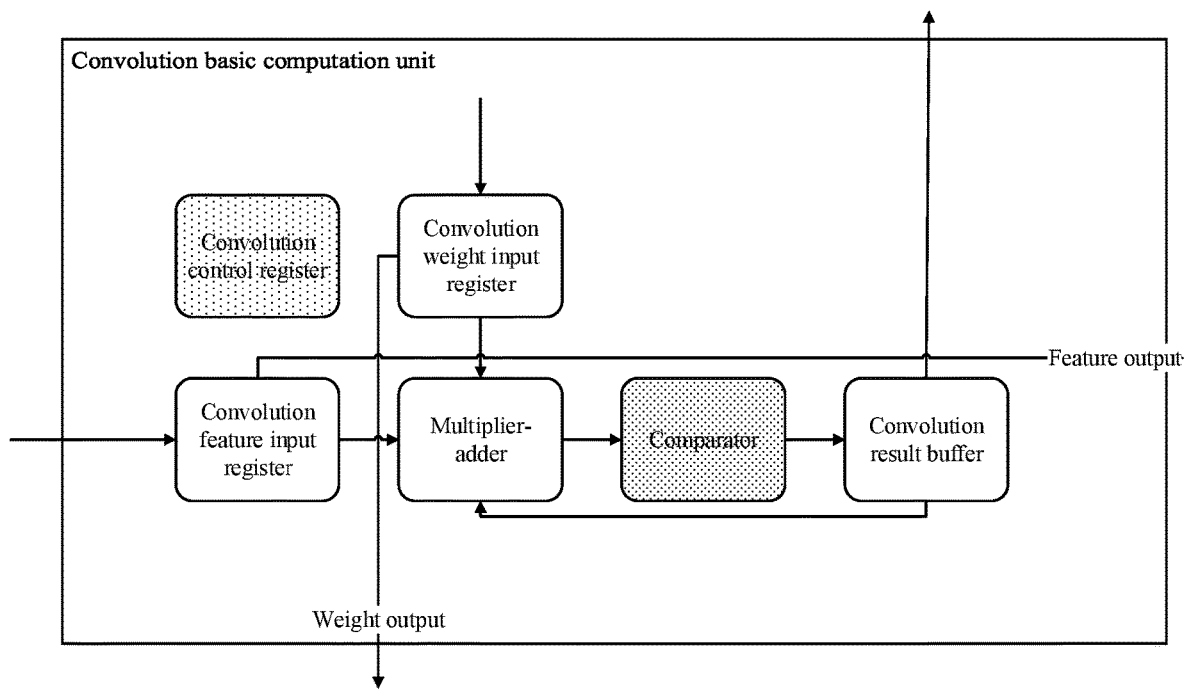
FIG. 1E illustrates a schematic structural diagram showing a basic computation unit of a systolic array in a convolution mode according to some embodiments of the present disclosure.

FIG. 1E illustrates a schematic structural diagram showing a basic computation unit of a systolic array in a convolution mode according to some embodiments of the present disclosure. As shown in FIG. 1E, in the convolution mode, each basic computation unit further includes a weight input register and a multiplier-adder. The comparator does not participate in the computation. The convolution control register can be connected to the convolution feature input register, the convolution weight input register, the convolution result buffer, and the multiplier-adder. The connection relationship between the convolution control register and the convolution feature input register, the convolution weight input register, the convolution result buffer, and the multiplier-adder is not shown in the drawing. The basic computation unit of embodiments of the present disclosure can be configured to perform the convolution computation in the convolution mode.

The convolution weight input register can refer to a register configured to store the convolution weight data. In the image processing field, the convolution weight data can be convolution window data. In other fields, the weight data can also be any data requiring convolution.

The convolution feature data can include at least one piece of data stored in the convolution feature input register in the convolution mode. In the image processing field, the convolution feature data can be image data. In other fields, the convolution feature data can also be any data that requires convolution. The convolution temporary data can be the cumulative addend needed for each current computation cycle. The convolution data result can be data with the new feature composed of convolution temporary data of the convolution result buffer in the plurality of basic computation units.

In some embodiments, the basic computation unit of embodiments of the present disclosure can also realize a basic function of the convolution computation. Two series of feature data with the convolution requirement can exist in the convolution weight input register and the convolution feature input register. The two series of feature data can be input to the multiplier-adder to perform the convolution computation to obtain the data with the new feature.

In some embodiments, the convolution computation of the current convolution basic computation unit can be taken as an example for illustration. The convolution control register can send a control signal corresponding to the convolution mode to control the convolution weight data of the convolution weight input register, the convolution feature data of the convolution feature input register, and the convolution temporary data of the convolution result buffer into the multiplier-adder. In each computation cycle, the convolution temporary data of the convolution result buffer can be used as the cumulative addend to successively perform the multiplication computation of the convolution feature data and the convolution weight data. The computation result can be used and stored as the new convolution temporary data. In addition, in embodiments of the present disclosure, after the current computation cycle is performed, the convolution feature data and the convolution weight data can be transmitted to the convolution feature input register and the convolution weight input register of the next convolution basic computation unit. The same convolution computation can be performed on the newly input convolution feature data and the convolution weight data. Similarly, for the convolution computation of the next convolution basic computation unit, reference can be made to the above description.

In some embodiments, the basic convolution computation function can be realized by setting a related instruction of the convolution control register in the convolution mode.

Figure 2A:
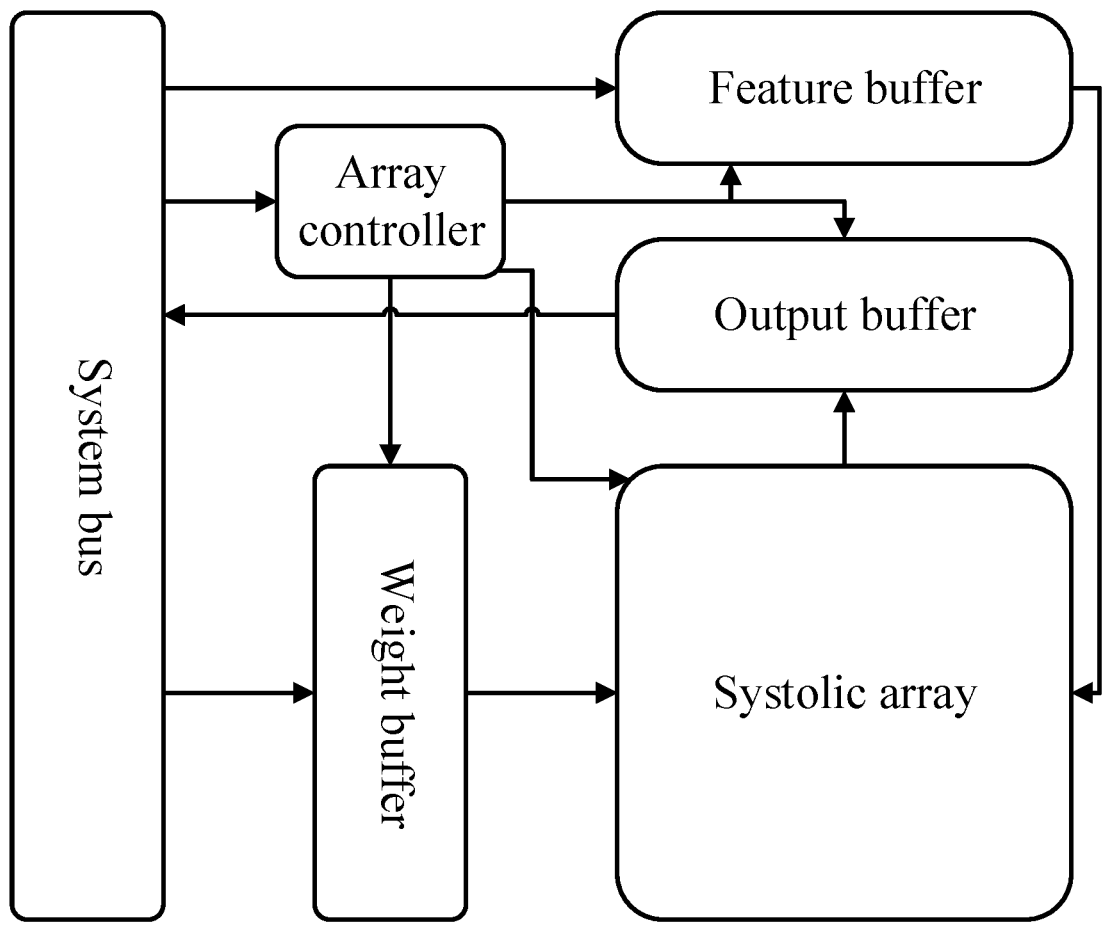
FIG. 2A illustrates a schematic structural diagram of a systolic array system according to some embodiments of the present disclosure.

FIG. 2A illustrates a schematic structural diagram of a systolic array system according to some embodiments of the present disclosure. The systolic array system includes a systolic array, a system bus, an array controller, a feature buffer, and an output buffer that are configured to perform a sorting operation in the sorting mode.

The system bus is connected to the array controller, the feature buffer, and the output buffer. The system bus can be used to send a first control instruction to the array controller. After the sorting operation is performed, the system bus can be used to receive a first data result uploaded by the output buffer.

The array controller is connected to the feature buffer, the systolic array, and the output buffer. The array controller can be configured to control the first feature data to be input into the feature buffer after sending the first control signal according to the first control instruction. The array controller can further be configured to input the first feature data of the feature buffer into the systolic array successively to perform the sorting operation after assigning first configuration values to the basic computation units of the systolic array. After the sorting operation is performed, the array controller can be further configured to transfer the first data result to the output buffer. The first feature data can be a plurality of candidate detection frame values generated by a neural network model.

The system bus can be a main assembly for connecting the computer system. The system bus can be used to receive an operation instruction and data that needs to be sorted sent by a central controller and send the first control instruction to the array controller. The array controller can be configured to control and decode the received first control instruction to store and forward the data and manage the whole array. The feature buffer can be configured to store the first feature data with a sorting requirement. The output buffer can be configured to receive the first data result uploaded by the systolic array and then transmit the first data result back to the system bus.

The first control instruction can be a sorting instruction obtained by analyzing the operation instruction by the system bus. The first control instruction can be sent to the array control system. The first control signal can be a sorting execution signal for devices in the array control system to interact with each other and can be used to implement the sorting operation. Since the systolic array of embodiments of the present disclosure can be used to realize the convolution computation and sorting computation, two sets of configuration values can be set in the control registers of the basic computation units in the systolic array. Different configuration values can correspond to different operation modes. Thus, control signals of different operation modes can be sent to the devices of the basic computation units. A first configuration value can be a corresponding configuration value in the sorting operation mode.

In some embodiments, image processing by a CNN can be taken as an example for illustration. The first feature data can be the plurality of candidate detection frame values generated by the neural network model. In embodiments of the present disclosure, after receiving the operation instruction, the system bus can be used to send the first control instruction to the array controller according to the content of the operation instruction. The array controller can be further used to send the first control signal to related devices in the systolic array system according to the first control instruction to finish the sorting operation. In some embodiments, the image data involved in the sorting computation can be used as the first feature data to be transmitted to the feature buffer according to a predetermined format to change into a data sequence used when the real sorting computation is performed. The first configuration value can be assigned to the control registers in the basic computation units in the systolic array to cause the basic computation units to cooperate to perform the sorting operation. The first feature data in the feature buffer can be input to the systolic array successively to perform the sorting operation. After the sorting operation is performed, the first data result of the systolic array can be transmitted to the output buffer and transmitted back to the system bus.

In embodiments of the present disclosure, the sorting mode can be topk algorithm sorting. The array controller can also be configured to input the first feature data into k basic computation units one by one to perform the sorting operation. In a kth basic computation unit, the feature data meeting the second sorting condition can be discarded to obtain k data results with the sorting feature. The k data results with the sorting feature can be output as the first data result.

In some embodiments, a mainstream target detection algorithm in the existing technology, such as SSD, Faster-RCNN, YOLO, etc., can generate a large number of possible detection frames and probability or confidence corresponding to the large number of possible detection frames. In an algorithm post-processing phase, k detection frames with relatively large possibility need t be selected and output as the result through a topk operator. In some embodiments, a scenario in which the type of target detection algorithm is applied can be a scenario, for example, a vehicle camera determining whether a pedestrian, a vehicle, or an obstacle presents ahead.

In some embodiments, a schematic structural diagram of the operation mode of the sorting computation of embodiments in the present disclosure can be as shown in FIG. 1B. In the sorting mode, no weight input and output can exist, and the multiplier-adder can be bypassed. When the first data enters the basic computation unit, the first data can be directly stored in the result buffer. Non-first data can enter the comparator from the feature input register and be compared with the data in the result buffer. The sorted result can be input to the result buffer and according to the configuration (e.g., output a larger value or a smaller value), and the feature can be output. After all data is sorted, the data in the result buffer can be output.

In some embodiments, for the topk computation of embodiments of the present disclosure, according to the first control signal of the array controller, a total of k basic computation units can be determined. The comparator of each basic computation unit can be configured to input the data meeting a larger condition (the first sorting condition) into the basic computation unit. Since the total of k basic computation units are used in embodiments of the present disclosure, to improve computation efficiency, the data meeting the second sorting condition can be discarded in the k-th basic computation unit of embodiments of the present disclosure. After the k basic computation units are sorted, k data results with the sorting feature can be obtained.

Figure 2B:
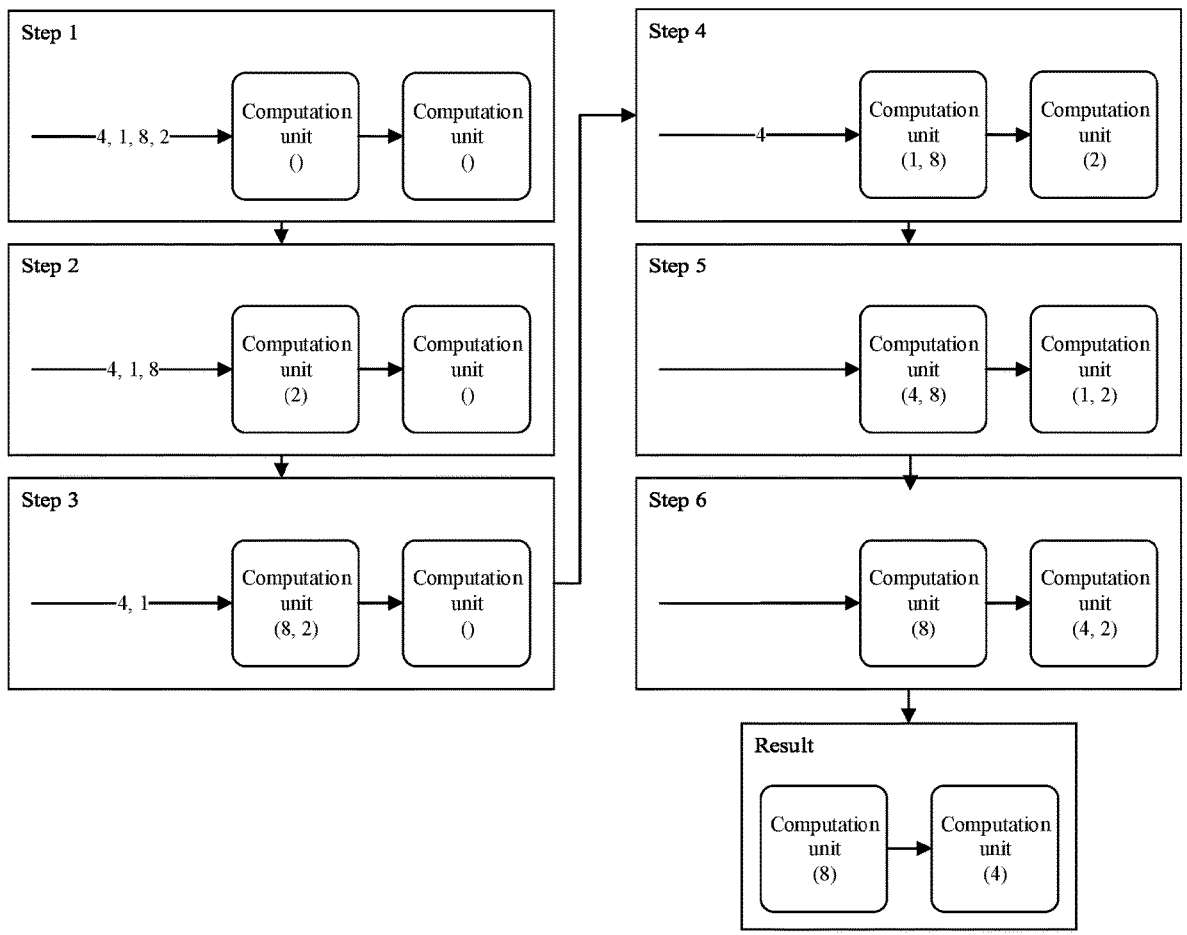
FIG. 2B illustrates a schematic structural diagram of a systolic array system according to some embodiments of the present disclosure.

FIG. 2B illustrates a schematic diagram showing a process of using four-digit data to perform top2 computations according to some embodiments of the present disclosure. The computation unit in FIG. 2B is the basic computation unit. As shown in FIG. 2B, in embodiments of the present disclosure, the top2 computation is performed on 4 pieces of random data (4, 1, 8, 2). Since k is 2, two larger numbers can be selected. The comparator in each basic computation unit can be configured to input the larger data into the result buffer and output the smaller data to the next basic computation unit. After the sorting computation is completed, k larger numbers can be sorted from large to small to be sequentially listed in the systolic array. The systolic array can output sorted results 8 and 4.

In embodiments of the present disclosure, as shown in FIG. 2A, the systolic array system further includes a weight register, which is connected to the system bus, the array controller, and the systolic array and configured to perform the convolution computation in the convolution mode.

Correspondingly, the system bus can be further configured to send a second control instruction to the array controller and receive a second data result uploaded by the output buffer after the convolution computation is performed.

The array controller can be further configured to control second configuration values of the control registers assigned to the basic computation units in the systolic array after sending the second control signal according to the second control instruction. The array controller can be further configured to use the second feature data of the feature buffer and the weight data of the weight buffer as two columns of corresponding data and input the two columns of corresponding data successively into the systolic array to perform convolution computation. After the convolution computation is performed, the array controller can be further configured to transmit the second data result to the output buffer. The weight data can be the convolution window data sorted according to a first predetermined format. The second feature data can be the image data sorted according to a second predetermined format.

The weight buffer can be configured to store the weight data with the convolution requirement. The system bus can be configured to receive operation instructions sent by the central controller and data requiring the convolution computation and send the second control instruction to the array controller. The array controller can be configured to control and decode the received second control instruction to store and forward the data and manage the whole array. The feature buffer can be configured to store the second feature data with the convolution requirement. The output buffer can be configured to receive the second data result uploaded by the systolic array and then transmit the second data result back to the system bus.

The second control instruction can be a convolution computation instruction obtained by analyzing the operation instruction by the system bus. The second control instruction can be sent to the array control system. The second control signal can be a convolution computation execution signal for the interaction of the devices in the array control system and can be used to realize the convolution computation. The second configuration value can be a corresponding configuration value in the convolution computation operation mode. The predetermined sequence can include sorting the second feature data of the feature buffer and the weight data of the weight buffer as two columns of data in different directions. For example, the second feature data of the feature buffer can be data sorted in the horizontal direction. The weight data of the weight buffer can be data sorted in the vertical direction.

In some embodiments, the image processing by the CNN can be taken as an example for illustration. The weight data can be the convolution window data sorted according to the first predetermined format. The second feature data can be the image data sorted according to the second predetermined format. The first predetermined format and the second predetermined format can be sorting formats conforming to the convolution computation. In embodiments of the present disclosure, after receiving the operation instruction, the system bus can send the second control instruction to the array controller according to the content of the operation instruction. Then, the array controller can send the second control signal to the relevant devices in the systolic array system according to the second control instruction to complete the convolution computation operation. In some embodiments, the second configuration values of the control registers can be assigned to the basic computation units in the systolic array to cause the basic computation units to cooperate to perform the convolution computation operation. The second feature data of the feature buffer and the weight data of the weight buffer can be used as the two columns of corresponding data, which can be input into the systolic array one by one according to the predetermined sequence to perform regular convolution computation. After the convolution computation is completed, the second data result of the systolic array can be transmitted to the output buffer and returned back to the system bus.

Figure 2C:
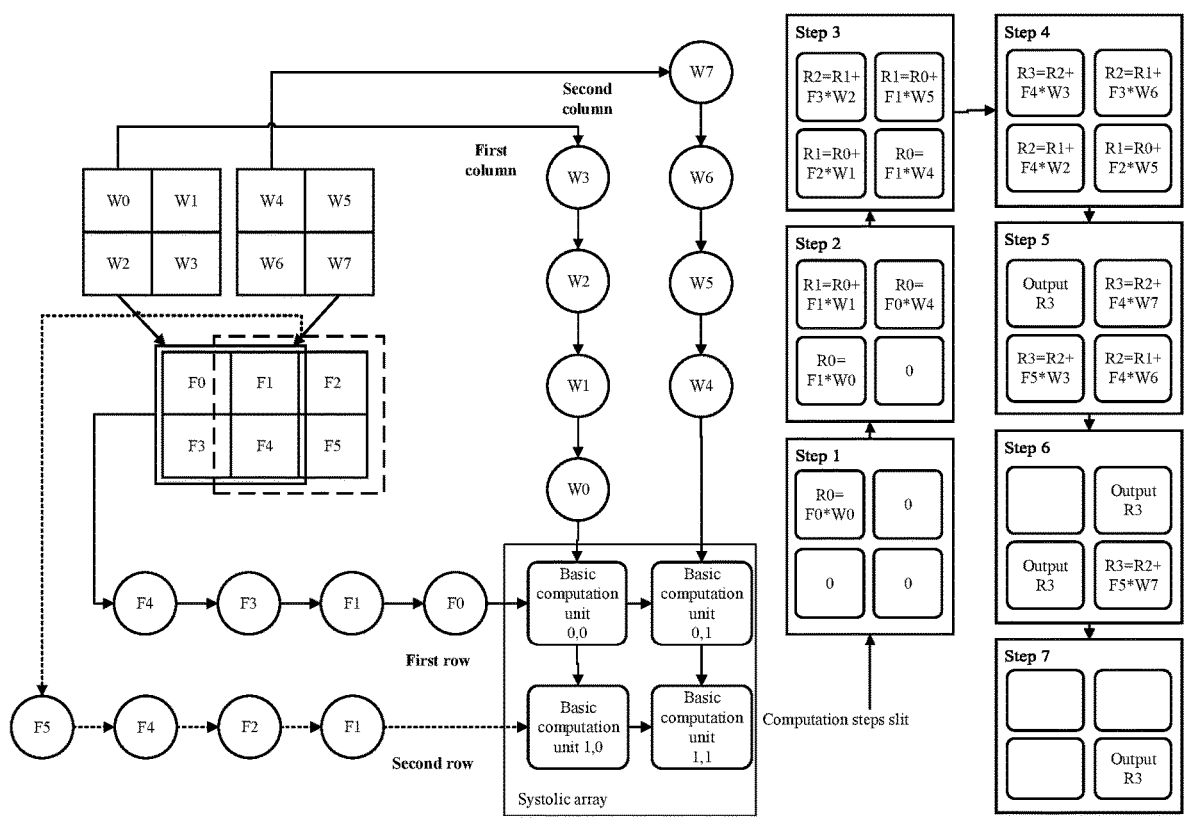
FIG. 2C illustrates a schematic diagram showing an exemplary convolution splitting and computation process according to some embodiments of the present disclosure.

FIG. 2C illustrates a schematic diagram showing an exemplary convolution splitting and computation process according to some embodiments of the present disclosure. In embodiments of the present disclosure, a whole computation process of a two-dimensional convolution is illustrated. The value of the input feature map $F_{in}$ can be [1, 1, 2, 3], that is the second feature data. The value of the weight W can be [2, 1, 2, 2], that is the weight data. The value of the output feature map $F_{out}$ can be [1, 2, 1, 2]. Thus, a systolic array of size 2×2 can be used for computation. During the convolution computation process, the last two dimensions of W can slide across $F_{in}$ in the form of the sliding window, and the weighted summation can be performed on $F_{in}$ within the sliding window range. W and $F_{in}$ within the sliding window range can be re-sorted correspondingly to generate two $F_{in}$ vectors and two W vectors, respectively, which can be correspondingly input into the systolic array to perform computation. The systolic array can adopt an output stationary mode to input input vectors into the systolic array one by one according to a sequence. The multiplication and addition results can be stored in the result buffer of the current basic computation unit.

In some embodiments, as shown in FIG. 2C, $F_{in}$[1, 1, 2, 3] can be represented as a feature map with a channel size of 2×3. W [2, 1, 2, 2] can be represented as two convolution windows with a channel size of 2×2. Corresponding to the content in FIG. 2C, the second feature data can be sorted according to the convolution computation format into two columns of data as follows: F0, F1, F3, and F4, and F1, F2, F4, and F5. The weight data can be sorted according to the convolution computation format into two columns of data as follows: W0, W1, W2, and W3, and W4, W5, W6, and W7. The two columns of feature data can be data sorted in the horizontal direction. The two columns of weight data can be data sorted in the vertical direction. In addition, the predetermined sequence can also include that a first row of data in the second feature data and a first column of data in the weight data have priority over a second row of data in the second feature data and a second column of data in the weight data to enter into the systolic array for one takt.

In embodiments of the present disclosure, the conventional systolic array system can include an improved systolic array. The systolic array can include the comparator. The array controller can be configured to send the first control signal to other devices in the systolic array system in the sorting computation. The first control signal can be used to pass the sorting instruction to realize the sorting function. The operation of transferring the data to the other apparatuses for performing the sorting operation can be avoided, which can save computation time and bandwidth and improve the utilization rate of the systolic array in the computation.

The systolic array system of FIG. 2A includes the systolic array, the system bus, the array controller, the feature register, and the output register, which can be configured to perform the sorting operation in the sorting mode.

The system bus is connected to the array controller, the feature buffer, and the output buffer. The system bus can be configured to send a sorting control instruction to the array controller, and after the sorting is performed, receive the sorting feature data uploaded by the output buffer and the synchronous tag data corresponding to the sorting feature data.

The array controller is connected to the feature buffer, the systolic array, and the output buffer. The array controller can be configured to control the feature data and the tag data corresponding to the feature data to be input into the feature buffer after sending the sorting control signal according to the sorting control instruction. After different configuration values are assigned to the first basic computation unit and the second basic computation unit of the systolic array, the array controller can be further configured to input the feature data of the feature buffer and the tag data corresponding to the feature data in the systolic array to perform synchronous sorting operation, and after the sorting is performed, output the sorting feature data and the synchronous tag data corresponding to the sorting feature data to the output buffer. The feature data can be the plurality of candidate detection frame values generated by the neural network model. The tag data can be position index information corresponding to the plurality of candidate detection frame values.

The system bus can be the main assembly for connecting the computer system. The system bus can be configured to receive an operation instruction sent by the central controller and the data that needs to be sorted, and send control instructions of different tasks to the array controller. When the feature data processed by the systolic array is a sorting task, the system bus can send a sorting control instruction to the array device. The array controller can be configured to control and decode the received sorting control instruction to store and forward the data and manage the entire array. The feature buffer can be configured to store the sorting feature data with the sorting requirement. The output buffer can be configured to receive the sorting data result uploaded by the systolic array and then transmit the sorting data back to the system bus.

The sorting control instruction can be a sorting instruction obtained by analyzing the operation instruction by the system bus, which can be sent to the array controller. When the task received by the systolic array of embodiments of the present disclosure is the sorting computation, the array controller can assign the first configuration value to the first control register of the first basic computation unit in the systolic array and assign the second configuration value to the second control register of the second basic computation unit. The sorting control signal can be a sorting execution signal for the devices to interact with each other in the array controller. The sorting control signal can be used to implement the sorting computation. The first configuration value can correspond to the first control signal, which is used to cause the first basic computation unit to complete the sorting operation of the feature data. The second configuration value can correspond to the second control signal and can be used to cause the second basic computation unit to complete the synchronous following and sorting operation of the tag data.

In some embodiments, the sorting operation can be performed in the sorting mode. The system bus can send the sorting control instruction to the array controller. The array controller can send the sorting control signal. After different configuration values are assigned to the first basic computation unit and the second basic computation unit of the systolic array, the system bus can input the feature data stored in the feature buffer and the tag data corresponding to the feature data to the systolic array successively in groups according to a sequence to perform the sorting operation synchronously. After the sorting is performed, the sorting feature data with the sorting feature output by the systolic array can be output to the output buffer according to the synchronous tag data corresponding to the sorting feature data. The sorting feature data can be transmitted to the system bus through the output buffer.

Figure 2D:
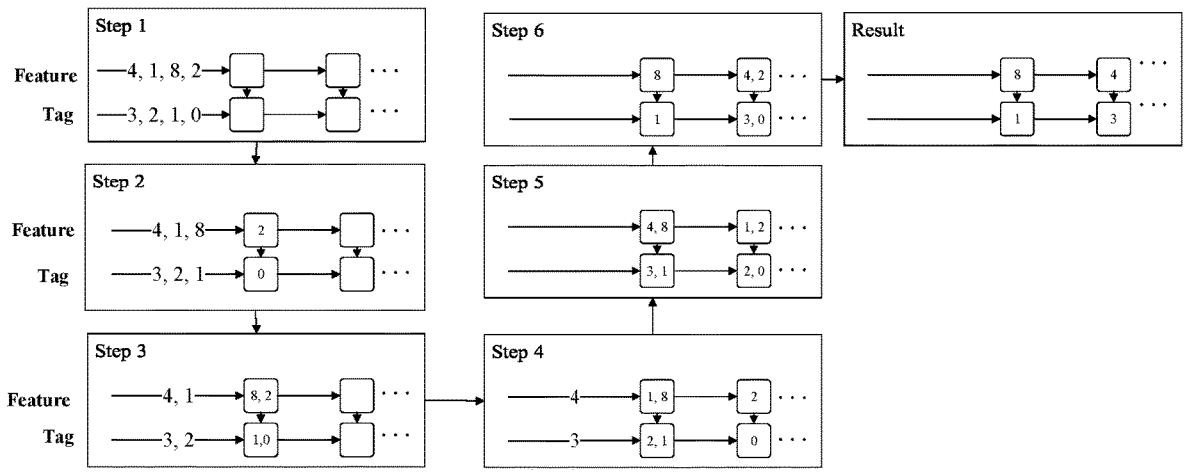
FIG. 2D illustrates a schematic diagram showing a feature data sorting process of four pieces of data with tags according to some embodiments of the present disclosure.

FIG. 2D illustrates a schematic diagram showing a feature data sorting process of four pieces of data with tags according to some embodiments of the present disclosure, which belongs to complex tag data, that is, a scenario exceeding a data input bit width of a single basic computation unit. As shown in FIG. 2D, a sorting process of maintaining position index is performed on the four pieces of data (4, 1, 8, 2) arranged out of order. The computation process can require 2 rows of basic computation units. In a first row, the sorting mode can be adopted, the sorting can be performed on the feature data (4, 1, 8, 2), and the synchronous control signal associated with the tag can be output. The position index can be used as the tag data and enter a second row of basic computation units in the shadow mode with the feature data one-to-one to perform sorting (exchange position) corresponding to the feature data. After the sorting computation is performed, the original feature data can be sorted from large to small in the first result buffer of the first row of basic computation units. A position of each piece of feature data in the original data, that is the tag data, can be sorted in the second result buffer of the second row of basic computation units correspondingly. The sorted feature data and the synchronous tag data can be input to the systolic array at last.

In some embodiments, the feature data with the tag data can be successively input into the systolic array in groups from the feature buffer, The feature data in the first row can be input into the first basic computation units of the systolic array one by one. The tag data in the second row can be input to the second basic computation units of the systolic array one by one. Each row of data can enter the systolic array sequentially from the feature input device of the first basic computation unit.

An operation mode of the first basic computation unit in the sorting mode can be as follows.
  i) The weight input register and the multiplier-adder can be bypassed.
  ii) When the first feature data enters the computation unit, the first feature data is directly stored in the first result buffer, and no synchronous control signal is output.
  iii) Non-first feature data enters the first comparator from the first feature input and is compared with the data in the first result buffer. The sorted result is input into the first result buffer and the feature output buffer according to the predetermined sorting rule (for example, outputting a larger value or a smaller value). The comparison symbol is used as a synchronous control signal to be transmitted from the weight output line to the next computation unit.

iv) After all the data is sorted, the feature in the first result buffer is output.

The operation mode of the second basic computation unit in the shadow mode can be as follows.

i) The multiplier-adder is bypassed.

ii) When the first tag data enters the basic computation unit, the tag data is directly stored in the second result buffer, and no weight data is input and output.

iii) When non-first tag data enters the second comparator from the second feature input register, according to the synchronous control signal entering the second comparator from the weight input register, the second control comparator can output the tag data and the temporary tag data in the second result buffer to the second result buffer and the feature output buffer according to the comparison result of the first basic computation unit, respectively, to synchronously move the tag. If the basic computation unit below also adopts the shadow mode, the control signal continues to be broadcasted to the next basic computation unit from the weight output line.

iv) After all feature data and tag data are sorted, the tag in the second result buffer is output.

As shown in FIG. 2A, in embodiments of the present disclosure, the systolic array system further includes the weight register, which is connected to the system bus, the array controller, and the systolic array. The weight register can be configured to perform the convolution computation in the convolution mode.

Correspondingly, the system bus can also be configured to send the convolution control instruction to the array controller and receive the convolution data result uploaded by the output buffer after the convolution computation is performed.

The array controller can be also configured to assign the convolution configuration values to the control registers of the basic computation units in the systolic array after sending the convolution control signal according to the convolution control instruction. The array controller can be further configured to use the convolution feature data in the convolution feature buffer and the convolution weight data in the convolution weight buffer as two columns of corresponding data and input the two columns of corresponding data into the systolic array one by one according to the predetermined sequence to perform the convolution computation. After the convolution computation is performed, the array controller can be further configured to transmit the convolution data result to the output buffer. The convolution weight data can be convolution window data sorted according to the first predetermined format. The convolution feature data can be the image data sorted according to the second predetermined format.

The weight buffer can be configured to store the weight data with the convolution requirement. The system bus can be configured to receive the operation instruction sent by the central controller and the data that needs the convolution computation and send the convolution control instruction to the array controller. The predetermined sequence, the first predetermined format, and the second predetermined format can be sorting formats conforming to the convolution computation. The convolution configuration value can correspond to the convolution control signal and can be used to cause the convolution basic computation unit to perform the convolution computation operation of the convolution feature data and convolution weight data. For example, in the image processing field, the convolution weight data can be the convolution window data sorted according to the first predetermined format. The convolution feature data can be the image data sorted according to the second predetermined format.

In some embodiments, in the convolution computation mode, the array controller of embodiments of the present disclosure can be further configured used to send the convolution control signal according to the convolution control instruction sent by the system bus, and assign the convolution configuration values to the convolution control registers of the convolution basic computation units of the systolic array. The array controller can be further configured to use the convolution feature data of the convolution feature buffer and the convolution weight data of the convolution weight buffer as the two columns of corresponding data to input the two columns of corresponding data to the systolic array one by one according to the predetermined sequence to perform the convolution computation, and after the convolution computation is performed, receive and transmit the convolution data result of the systolic array to the output buffer, and transmit the convolution data result to the system bus through the output buffer.

The systolic array system of embodiments of the present disclosure can support the improved systolic array to perform the synchronous sorting of the data with the tag. The direct computation and following function of the complex sorting operator can be realized in the systolic array. The utilization rate of the systolic array can be improved. The problem of wasting the transmission bandwidth caused by the data transfer can be avoided.

Figure 3:
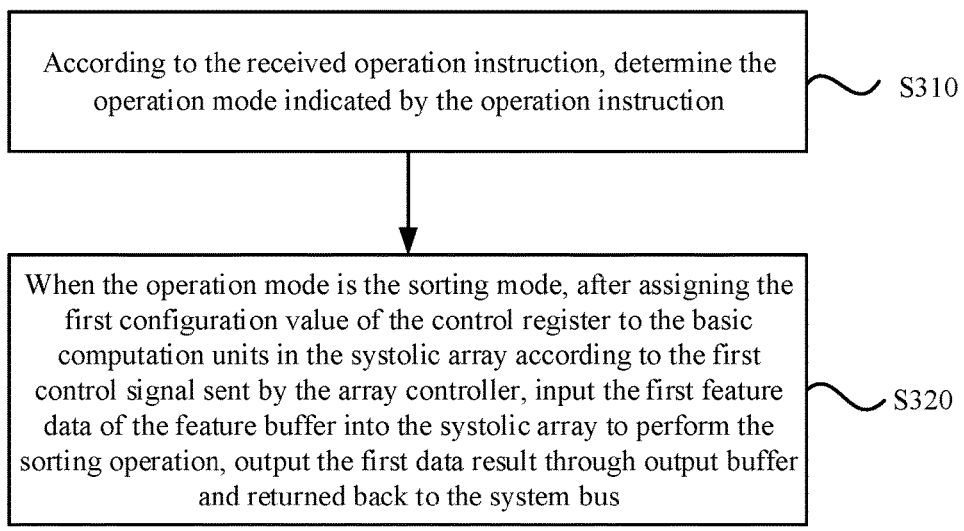
FIG. 3 illustrates a schematic flowchart of a computation method of a systolic array system according to some embodiments of the present disclosure.

FIG. 3 illustrates a schematic flowchart of a computation method of a systolic array system according to some embodiments of the present disclosure. The method can be executed by the computation device of the systolic array system of embodiments of the present disclosure and applied to the systolic array system. The device can be implemented in software and/or hardware. In some embodiments, the method includes the following processes.

At S310, according to the received operation instruction, the operation mode indicated by the operation instruction is determined.

In embodiments of the present disclosure, determining the operation mode indicated by the operation instruction according to the received operation instruction can include sending the first control instruction by the system bus to the array controller according to the received operation instruction and determining the first control signal of the array controller according to the first control instruction.

In some embodiments, the operation mode can include a sorting computation mode and a convolution computation mode. The sorting computation mode can also include a topk computation mode. The operation instruction can include task information. In embodiments of the present disclosure, the corresponding operation mode can be determined according to the operation instruction.

At S320, when the operation mode is the sorting mode, after assigning the first configuration value of the control register to the basic computation units in the systolic array according to the first control signal sent by the array controller, the first feature data of the feature buffer can be input into the systolic array to perform the sorting operation. The first data result can be output through the output buffer and returned back to the system bus.

Each of the basic computation units in the systolic array can include the comparator. The first feature data of the feature buffer can be the plurality of candidate detection frame values generated by the neural network model.

In embodiments of the present disclosure, the sorting mode can be the topk algorithm sorting. Inputting the first feature data of the feature register into the systolic array one by one to perform the sorting operation and outputting the first data result through the output buffer can include inputting the first feature data of the feature register one by one into k basic computation units in the systolic array to perform the sorting operation to obtain k data results with the sorting feature and using the k data results with the sorting feature as the first data result to be output through the output buffer.

In embodiments of the present disclosure, the computation method of the systolic array system can further include, when the operation mode is the convolution mode, after assigning the second configuration value of the control register to the basic computation units in the systolic array through the second control signal sent by the array controller, using the second feature data of the feature buffer and the weight data of the weight buffer as the two columns of corresponding data, inputting the two columns of corresponding data into the systolic array one by one according to the predetermined sequence to perform the convolution computation, and outputting the second data result through the output buffer and transmitting back to the system bus.

Correspondingly, according to the received operation instruction, determining the operation mode indicated by the operation instruction can include sending the second control instruction from the system bus to the array controller according to the received operation instruction and determining the second control signal of the array controller according to the second control instruction.

The weight data of the weight buffer can be the convolution window data sorted according to the first predetermined format. The second feature data of the feature buffer can be the image data sorted according to the second predetermined format.

The systolic array system computation method of the present disclosure can include determining the operation mode indicated by the operation instruction according to the received operation instruction, when the operation mode is the sorting mode, after assigning the first configuration value of the control register to the basic computation units in the systolic array through the first control signal sent by the array controller, inputting the first feature data of the feature buffer into the systolic array one by one to perform the sorting operation. The method can further include outputting the first data result through the output buffer and transmitting the first data result back to the system bus. Each of the basic computation units of the systolic array can include the comparator. While the neural network convolution computation is accelerated, the sorting function can be realized. Thus, the operation of transferring the data to the other apparatuses to perform the sorting operation can be avoided, which saves the computation time and bandwidth and improves the utilization rate of the systolic array in the computation. Meanwhile, the computation efficiency of the neural network and the utilization rate of the hardware unit in the computation can be improved.

Figure 4:
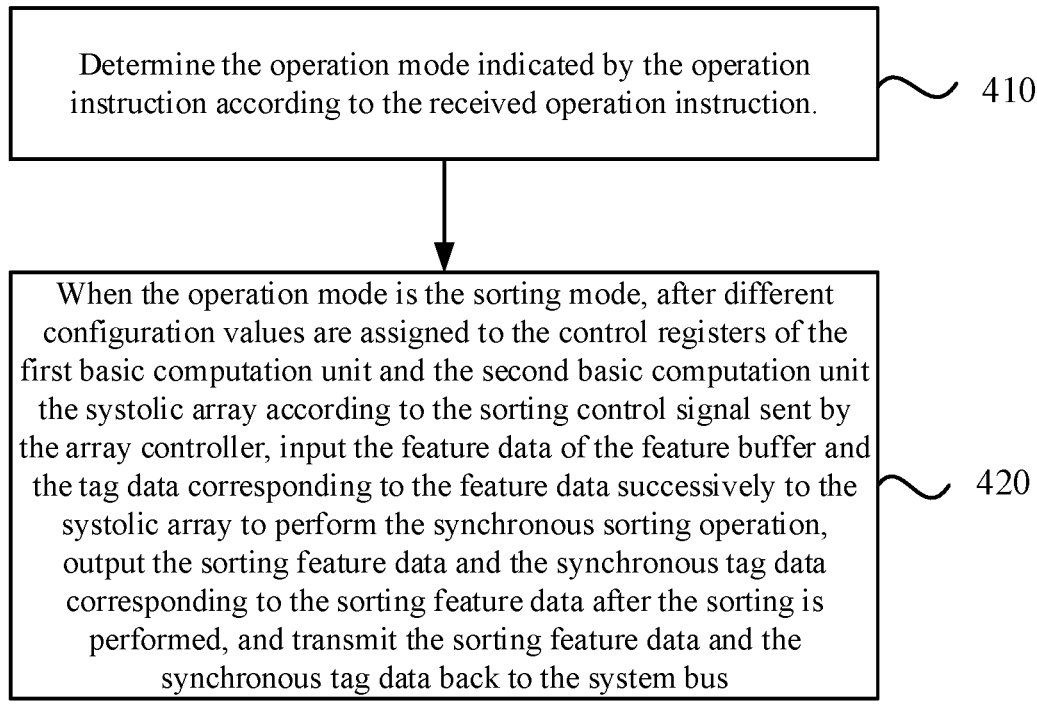
FIG. 4 illustrates a schematic flowchart of a computation method of a systolic array system according to some embodiments of the present disclosure.

FIG. 4 illustrates a schematic flowchart of a computation method of a systolic array system according to some embodiments of the present disclosure. The method can be executed by the computation device of the systolic array system of embodiments of the present disclosure. The device can be implemented by software and/or hardware. The method includes the following processes.

At S410. the operation mode indicated by the operation instruction is determined according to the received operation instruction.

In embodiments of the present disclosure, determining the operation mode indicated by the operation instruction according to the received operation instruction can include sending the sorting control instruction from the system bus to the array controller according to the received operation instruction, and determining the sorting control signal of the array controller according to the sorting control instruction.

The operation instruction can be instruction information including task content. In embodiments of the present disclosure, the operation mode can include the sorting computation mode and the convolution computation mode. When the operation mode is the sorting computation mode, the array controller can send the sorting control signal to other devices of the systolic array system according to the received sorting control instruction to perform the corresponding sorting operation. When the operation mode is the convolution computation mode, the array controller can send the convolution control signal to the other devices in the systolic array system according to the received array control instruction to perform the corresponding convolution computation operation.

At S420, when the operation mode is the sorting mode, after different configuration values are assigned to the control registers of the first basic computation unit and the second basic computation unit the systolic array according to the sorting control signal sent by the array controller, the feature data of the feature buffer and the tag data corresponding to the feature data is successively input to the systolic array to perform the synchronous sorting operation, the sorting feature data and the synchronous tag data corresponding to the sorting feature data are output after the sorting is performed, and the sorting feature data and the synchronous tag data are transmitted back to the system bus.

The first basic computation unit and the second basic computation unit in the systolic array can include the comparator. The feature data of the feature buffer can include a plurality of candidate detection frame values generated by the neural network model. The tag data can include the position index information corresponding to the plurality of candidate detection frame values.

In embodiments of the present disclosure, the systolic array system can be further configured to, when the operation mode is the convolution mode, after the convolution configuration values are assigned to the control registers of the basic computation units in the systolic array according to the convolution control signal sent by the array controller, inputting the convolution feature data of the feature buffer and the convolution weight data of the weight buffer to the systolic array as the two columns of corresponding data according to the predetermined sequence to perform the convolution computation. After the convolution computation is performed, the convolution data result can be output through the output buffer and transmitted back to the system bus. The convolution weight data of the weight buffer can be the convolution window data sorted according to the first predetermined format. The convolution feature data of the feature buffer can be the image data sorted according to the second predetermined format.

Figure 5:
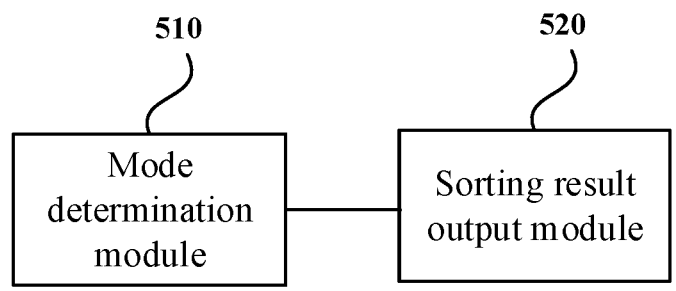
FIG. 5 illustrates a schematic structural diagram of a computation device of a systolic array system according to some embodiments of the present disclosure.

FIG. 5 illustrates a schematic structural diagram of a computation device of a systolic array system according to some embodiments of the present disclosure. The device includes a mode determination module 510 and a sorting result output module 520.

The mode determination module 510 can be configured to determine the operation mode indicated by the operation instruction according to the received operation instruction.

The sorting result output module 520 can be configured to, when the operation mode is the sorting mode, after the first configuration value of the control register is assigned to the basic computation units in the systolic array through the first control signal sent by the array controller, input the first feature data of the feature buffer into the systolic array one by one to perform the sorting operation, output the first data result through the output buff, and return the first data result back to the system bus. Each of the basic computation units in the systolic array can include a comparator. The first feature data of the feature register can be the plurality of candidate detection frames generated by the neural network model.

In some embodiments, the mode determination module 510 can be configured to send the first control instruction to the array controller through the system bus according to the received operation instruction and determine the first control signal of the array controller according to the first control instruction.

In some embodiments, the sorting result output module 520 can be configured to, when the sorting mode is topk algorithm sorting, input the first feature data of the feature buffer into the k basic computation units in the systolic array one by one to perform the sorting operation to obtain k data results with the sorting feature, and output k data results with the sorting feature as the first data result through the output buffer.

In some embodiments, the device can further include a convolution result output module.

When the operation mode is the convolution mode, after the second configuration value of the control register is assigned to the basic computation units in the systolic array through the second control signal sent by the array controller, the convolution result output module can be configured to use the second feature data of the feature buffer and the weight data of the weight buffer as the two columns of corresponding data, input the two columns of corresponding data into the systolic array according to the predetermined sequence to perform the convolution computation, output the second data result through the output buffer, and return the second data result back to the system bus. The weight data of the weight buffer can be the convolution window data sorted according to the first predetermined format. The second feature data of the feature buffer can be the image data sorted according to the second predetermined format.

Correspondingly, the mode determination module 410 can be configured to send the second control instruction from the system bus to the array controller according to the received operation instruction and determine a second control signal of the array controller according to the second control instruction.

In some other embodiments, the device includes the mode determination module 510 and the sorting result output module 520.

The mode determination module 410 can be configured to determine the operation mode indicated by the operation instruction according to the received operation instruction.

The sorting result output module 420 can be configured to, when the operation mode is the sorting mode, after different configuration values are assigned to the control registers of the first basic computation unit and the second basic computation unit according to the sorting control signal sent by the array controller, input the feature data of the feature buffer and the tag data corresponding to the feature data successively to the systolic array to perform the synchronous sorting operation. After the sorting is performed, the sorting result output module 520 can be further configured to output the sorting feature data and the synchronous tag data corresponding to the sorting feature data through the output buffer and transmit the sorting feature data and the synchronous tag data back to the system bus. The first basic computation unit and the second basic computation unit of the systolic array can include the comparator. The feature data of the feature buffer can include the plurality of candidate detection frame values generated by the neural network model. The tag data can include the position index information corresponding to the plurality of candidate detection frame values.

In some embodiments, the mode determination module can be further configured to send the sorting control instruction from the system bus to the array controller according to the received operation instruction and determine the sorting control signal of the array controller according to the sorting control instruction.

In some embodiments, the computation device of the systolic array system can further include the convolution result output module.

The convolution result output module can be configured to, when the operation mode is the convolution mode, after the convolution configuration values are assigned to the control registers of the basic computation units in the systolic array according to the convolution control signal sent by the array controller, input the convolution feature data of the feature buffer and the convolution weight data of the weight buffer to the systolic array one by one as the two columns of corresponding data according to the predetermined sequence to perform the convolution computation. The convolution result output module can be further configured to output the convolution data result through the output buffer after the convolution computation is performed and transmit the convolution data result back to the system bus. The convolution weight data of the weight buffer can be the convolution window data sorted according to the first predetermined format. The convolution feature data of the feature buffer can be the image data sorted according to the second predetermined format.

According to embodiments of the present disclosure, the present disclosure also provides a readable storage medium.

In the context of the present disclosure, a machine-readable medium can be a tangible medium that can contain or store a program, which can be used by or in connection with an instruction execution system, device, or apparatus. The machine-readable medium can be a machine-readable signal medium or a machine-readable storage medium. The machine-readable medium can include but is not limited to electronic, magnetic, optical, electromagnetic, infrared, or semiconductor systems, devices, or apparatuses, or any suitable combination thereof. More specific examples of the machine-readable storage medium can include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage apparatus, a magnetic storage apparatus, or any suitable combination thereof.

The steps can be rearranged, increased, or deleted by using the various forms of processes above. For example, the steps described in the present disclosure can be executed in parallel or in a different order, as long as the results expected by the technical solutions disclosed in the present disclosure can be implemented, which is not limited here.

In addition, the terms "first" and "second" are used for descriptive purposes only and cannot be understood as indicating or implying relative importance or implicitly indicating the number of indicated technical features. Thus, the features defined with "first" and "second" can explicitly or implicitly include at least one of the features. In the description of the present disclosure, "a plurality of" means two or more, unless specifically defined otherwise.

The above is merely specific embodiments of the present disclosure. However, the scope of the present disclosure is not limited to this. Those skilled in the art can easily think of modifications or replacements within the technical scope of the present disclosure. The modifications and replacements can be covered within the scope of the present disclosure. Therefore, the scope of the present disclosure shall be subject to the scope of the claims.

What is claimed is:

1. A systolic array comprising:
    a plurality of basic computation units arranged and connected in a matrix, each basic computation unit of the plurality of basic computation units including:
        a feature input register configured to store first feature data;
        a result buffer configured to temporarily store first temporary data;
        a comparator connected to the feature input register and the result buffer and configured to compare the first feature data input by the feature input register with the first temporary data temporarily stored in the result buffer successively; and
        a control register connected to the feature input register, the result buffer, and the comparator and configured to control the first feature data of the feature input register and the first temporary data temporarily stored in the result buffer to be input to the comparator, output a comparison result to the result buffer and a feature input register of a next basic computation unit, and after sorting is performed, output the first temporary data last stored in the result buffer as a first data result.

2. The systolic array according to claim 1, wherein:
    the comparator is further configured to:
        compare values of the first feature data input by the feature input register and the first temporary data temporarily stored in the result buffer; and
        according a predetermined sorting rule, use feature data meeting a first sorting rule as new first temporary data, and use feature data meeting a second sorting rule as first feature data of the feature input register of the next basic computation unit; and the control register is further configured to:
        control the new first temporary data to be output to the result buffer; and
        output the feature data meeting the second sorting condition to the feature input register of the next basic computation unit.

3. The systolic array according to claim 1, wherein the basic computation unit further includes:
    a weight input register configured to store weight data; and
    a multiplier-adder connected to the feature input register, the weight input register, and the result buffer and configured to use second temporary data temporarily stored in the result buffer as a cumulative addend, perform multiplication computation successively on second feature data input by the feature input register and the weight data input by the weight input register, and store a computation result as new second temporary data;
wherein:
    the weight input register and the multiplier-adder are configured to perform convolution computation in a convolution mode;
    the feature input register is further configured to store the second feature data; and
    the control register is connected to the weight input register and the multiplier-adder and configured to control the weight data of the weight input register, the second feature data of the feature input register, and the second temporary data temporarily stored in the result buffer to be input to the multiplier-adder, transmit the second feature data to a feature input register of a first neighboring basic computation unit and output the weight data to a weight input register of a second neighboring basic computation unit after a current computation cycle is performed, and output second temporary data lastly stored in the result buffer as a second data result.

4. The systolic array according to claim 1, further comprising:
    a plurality of first basic computation units and a plurality of second basic computation units connected to the plurality of first basic computation units by adopting a corresponding rectangular arrangement manner and configured to perform a synchronous sorting operation of feature data with a tag in a sorting mode;
wherein:
    each first basic computation unit of the plurality of first basic computation units including:
        a first comparator configured to compare input feature data; and
        a first control register configured to control a comparison symbol to be used as a synchronous control signal, output the synchronous control signal to a second basic computation unit corresponding to the first basic computation unit to output a comparison data result to first result buffer and a first feature input register of a next first basic computation unit, and output temporary feature data lastly stored in the first result buffer as sorting feature data;
    each second basic computation unit of the plurality of second basic computation units including:
        a second comparator configured to compare input tag data according to the synchronous control signal received by the synchronous weight input register; and
        a second control register configured to control a comparison tag result to be output to the second result buffer and a second feature input register of a next second basic computation unit, and synchronously output temporary tag data lastly stored in the second result buffer as the synchronous tag data of the sorting feature data.

5. The systolic array according to claim 4, wherein:
    the first basic computation unit includes:
        a first feature input register configured to store the feature data, the first result buffer being configured to temporarily store the temporary feature data;

the second basic computation unit includes:
  a second feature input register configured to store the tag data, the second result buffer being configured to temporarily store the temporary tag data;
the first control register is further configured to input the feature data of the first feature input register and the temporary feature data of the first result buffer to the first comparator; and
the second control register is further configured to input the tag data of the second feature input register and the temporary tag data of the second result buffer to the second comparator.

6. The systolic array according to claim 5, wherein:
the first comparator is further configured to:
  compare values of the feature data input by the first feature input register with the temporary feature data input by the first result buffer successively; and
  according to a predetermined sorting rule, use feature data meeting a first sorting condition as new temporary feature data, and use feature data meeting a second sorting condition as feature data of a first feature input register of a next first basic computation unit; and
the first control register is further configured to:
  control the new temporary feature data to be output to the first result buffer; and
  output the feature data meeting the second sorting condition to the first feature input register of the next first basic computation unit.

7. The systolic array according to claim 6, wherein:
the second comparator is further configured to:
  according to the synchronous control signal received by the synchronous weight input register, compare the tag data input by the second feature input register and the temporary tag data input by the second result buffer;
  use tag data meeting the first sorting condition as new temporary tag data; and
  use tag data meeting the second sorting condition as tag data of a second feature input register of a next second basic computation unit; and
the second control register is further configured to:
  control the new temporary tag data to be output synchronously to the second result buffer; and
  output the tag data meeting the second sorting condition to the second feature input register of the next second basic computation unit.

8. The systolic array according to claim 4, further comprising a convolution basic computation unit including, the first basic computation unit and the second basic computation unit belonging to the same convolution basic computation unit:
  a convolution weight input register configured to store convolution weight data;
  a convolution feature input register configured to store convolution feature data;
  a convolution result buffer configured to temporarily store convolution temporary data;
  a multiplier-adder configured to use the convolution temporary data temporarily stored in the convolution result buffer as a cumulative addend, perform multiplication computation of the convolution feature data input by the convolution feature input register, and the convolution weight data input by the convolution weight input register, and use a computation result as new convolution temporary data; and
  a convolution control register configured to:
    control the convolution weight data of the convolution weight input register, the convolution feature data of the convolution feature input register, and the convolution temporary data temporarily stored in the convolution result buffer to be input to the multiplier-adder;
    after a current computation cycle is performed, transmit the convolution feature data and the convolution weight data to a convolution feature input register and a convolution weight input register of a next convolution basic computation unit, respectively; and
    after the convolution computation is performed, output convolution temporary data lastly stored in the convolution result buffer as a convolution data result.

9. A systolic array system comprising:
a systolic array including:
  a plurality of basic computation units arranged and connected in a matrix, each basic computation unit of the plurality of basic computation units including:
    a feature input register configured to store first feature data;
    a result buffer configured to temporarily store first temporary data;
    a comparator connected to the feature input register and the result buffer and configured to compare the first feature data input by the feature input register with the first temporary data temporarily stored in the result buffer successively; and
    a control register connected to the feature input register, the result buffer, and the comparator and configured to control the first feature data of the feature input register and the first temporary data temporarily stored in the result buffer to be input to the comparator, output a comparison result to the result buffer and a feature input register of a next basic computation unit, and after sorting is performed, output the first temporary data last stored in the result buffer as a first data result;
a feature buffer;
an output buffer;
an array controller connected to the feature buffer, the systolic array, and the output buffer and configured to control the first feature data to be input to the feature buffer after a first control signal is sent according to a first control instruction, input the first feature data of the feature buffer to the systolic array one by one to perform sorting operation after first configuration values are assigned to control registers of the basic computation units of the systolic array, and transmit the first data result to the output buffer after the sorting is performed; and
a system bus connected to the array controller, the feature buffer, and the output buffer and configured to send the first control instruction to the array controller, and receive the first data result uploaded by the output buffer after the sorting is performed.

10. The system according to claim 9, wherein:
a sorting mode is topk algorithm sorting; and
the array controller is further configured to:
  input the first feature data to k basic computation units to perform a sorting operation;
  in a k-th basic computation unit, discarding feature data meeting a second sorting rule to obtain k data results with a sorting feature; and
  output the k data results with the sorting feature as the first data result.

11. The system according to claim 9, further comprising:
a weight buffer connected to the system bus, the array controller, and the systolic array and configured to perform convolution computation in a convolution mode;
wherein:
the system bus is further configured to send a second control instruction to the array controller and receive a second data result uploaded by the output buffer after the convolution computation is performed; and
the array controller is further configured to assign second configuration values to the control registers of the basic computation units of the systolic array after sending a second control signal according to the second control instruction, input the second feature data of the feature buffer and the weight data of the weight buffer as two columns of corresponding data to the systolic array one by one according to a predetermined sequence to perform the convolution computation, output the second data result to the output buffer after the convolution computation is performed, the weight data including convolution window data sorted according to a first predetermined format, and the second feature data including image data sorted according to a second predetermined format.

12. The system according to claim 9, wherein:
the comparator is further configured to:
compare values of the first feature data input by the feature input register and the first temporary data temporarily stored in the result buffer; and
according to a predetermined sorting rule, use feature data meeting a first sorting rule as new first temporary data, and use feature data meeting a second sorting rule as first feature data of the feature input register of the next basic computation unit; and
the control register is further configured to:
control the new first temporary data to be output to the result buffer; and
output the feature data meeting the second sorting condition to the feature input register of the next basic computation unit.

13. The system according to claim 9, wherein the basic computation unit further includes:
a weight input register configured to store weight data; and
a multiplier-adder connected to the feature input register, the weight input register, and the result buffer and configured to use second temporary data temporarily stored in the result buffer as a cumulative addend, perform multiplication computation successively on second feature data input by the feature input register and the weight data input by the weight input register, and store a computation result as new second temporary data;
wherein:
the weight input register and the multiplier-adder are configured to perform convolution computation in a convolution mode;
the feature input register is further configured to store the second feature data; and
the control register is connected to the weight input register and the multiplier-adder and configured to control the weight data of the weight input register, the second feature data of the feature input register, and the second temporary data temporarily stored in the result buffer to be input to the multiplier-adder, transmit the second feature data to a feature input register of a first neighboring basic computation unit and output the weight data to a weight input register of a second neighboring basic computation unit after a current computation cycle is performed, and output second temporary data lastly stored in the result buffer as a second data result.

14. The system according to claim 9, further comprising:
a plurality of first basic computation units and a plurality of second basic computation units connected to the plurality of first basic computation units by adopting a corresponding rectangular arrangement manner and configured to perform a synchronous sorting operation of feature data with a tag in a sorting mode;
wherein:
each first basic computation unit of the plurality of first basic computation units including:
a first comparator configured to compare input feature data; and
a first control register configured to control a comparison symbol to be used as a synchronous control signal, output the synchronous control signal to a second basic computation unit corresponding to the first basic computation unit to output a comparison data result to first result buffer and a first feature input register of a next first basic computation unit, and output temporary feature data lastly stored in the first result buffer as sorting feature data;
each second basic computation unit of the plurality of second basic computation units including:
a second comparator configured to compare input tag data according to the synchronous control signal received by the synchronous weight input register; and
a second control register configured to control a comparison tag result to be output to the second result buffer and a second feature input register of a next second basic computation unit, and synchronously output temporary tag data lastly stored in the second result buffer as the synchronous tag data of the sorting feature data.

15. The system according to claim 14, wherein:
the first basic computation unit includes:
a first feature input register configured to store the feature data, the first result buffer being configured to temporarily store the temporary feature data;
the second basic computation unit includes:
a second feature input register configured to store the tag data, the second result buffer being configured to temporarily store the temporary tag data;
the first control register is further configured to input the feature data of the first feature input register and the temporary feature data of the first result buffer to the first comparator; and
the second control register is further configured to input the tag data of the second feature input register and the temporary tag data of the second result buffer to the second comparator.

16. The systolic array according to claim 15, wherein:
the first comparator is further configured to:
compare values of the feature data input by the first feature input register with the temporary feature data input by the first result buffer successively; and
according to a predetermined sorting rule, use feature data meeting a first sorting condition as new temporary feature data, and use feature data meeting a second sorting condition as feature data of a first feature input register of a next first basic computation unit; and the first control register is further configured to:
control the new temporary feature data to be output to the first result buffer; and
output the feature data meeting the second sorting condition to the first feature input register of the next first basic computation unit.

17. The systolic array according to claim 16, wherein:
the second comparator is further configured to:
according to the synchronous control signal received by the synchronous weight input register, compare the tag data input by the second feature input register and the temporary tag data input by the second result buffer;
use tag data meeting the first sorting condition as new temporary tag data; and
use tag data meeting the second sorting condition as tag data of a second feature input register of a next second basic computation unit; and
the second control register is further configured to:
control the new temporary tag data to be output synchronously to the second result buffer; and
output the tag data meeting the second sorting condition to the second feature input register of the next second basic computation unit.

18. The systolic array according to claim 14, further comprising a same convolution basic computation unit including, the first basic computation unit and the second basic computation unit belonging to the same convolution basic computation unit:

a convolution weight input register configured to store convolution weight data;
a convolution feature input register configured to store convolution feature data;
a convolution result buffer configured to temporarily store convolution temporary data;
a multiplier-adder configured to use the convolution temporary data temporarily stored in the convolution result buffer as a cumulative addend, perform multiplication computation of the convolution feature data input by the convolution feature input register and the convolution weight data input by the convolution weight input register, and use a computation result as new convolution temporary data; and
a convolution control register configured to:
control the convolution weight data of the convolution weight input register, the convolution feature data of the convolution feature input register, and the convolution temporary data temporarily stored in the convolution result buffer to be input to the multiplier-adder;
after a current computation cycle is performed, transmit the convolution feature data and the convolution weight data to a convolution feature input register and a convolution weight input register of a next convolution basic computation unit, respectively; and
after the convolution computation is performed, output convolution temporary data lastly stored in the convolution result buffer as a convolution data result.

* * * * *